United States Patent
Venkatachalam Jayaraman et al.

(10) Patent No.: US 10,912,103 B2
(45) Date of Patent: Feb. 2, 2021

(54) TIME DIVISION DUPLEXED (TDD) SERVICE PERIOD

(71) Applicant: QUALCOMM Incorporated, San Diego, CA (US)

(72) Inventors: Venkata Ramanan Venkatachalam Jayaraman, San Diego, CA (US); George Cherian, San Diego, CA (US); Alfred Asterjadhi, San Diego, CA (US); Abhishek Pramod Patil, San Diego, CA (US); Solomon Trainin, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/050,641

(22) Filed: Jul. 31, 2018

(65) Prior Publication Data

US 2019/0045520 A1 Feb. 7, 2019

Related U.S. Application Data

(60) Provisional application No. 62/548,938, filed on Aug. 22, 2017, provisional application No. 62/540,460, filed on Aug. 2, 2017.

(51) Int. Cl.
*H04L 12/00* (2006.01)
*H04W 72/12* (2009.01)
(Continued)

(52) U.S. Cl.
CPC ......... *H04W 72/121* (2013.01); *H04L 5/0005* (2013.01); *H04L 5/0053* (2013.01);
(Continued)

(58) Field of Classification Search
None
See application file for complete search history.

(56) References Cited

U.S. PATENT DOCUMENTS

2007/0286215 A1 12/2007 Morris et al.
2011/0110268 A1 5/2011 Panasyuk et al.
(Continued)

FOREIGN PATENT DOCUMENTS

| EP | 2498435 A2 | 9/2012 |
|---|---|---|
| KR | 20160121391 A | 10/2016 |
| WO | 2016033249 A1 | 3/2016 |

OTHER PUBLICATIONS

International Search Report and Written Opinion—PCT/US2018/044851—ISA/EPO—Feb. 21, 2019.
(Continued)

*Primary Examiner* — Noel R Beharry
*Assistant Examiner* — Lionel Preval
(74) *Attorney, Agent, or Firm* — Steven R. Thiel

(57) ABSTRACT

Certain aspects of the present disclosure provide methods and apparatus relating to distribution networks that utilize point-to-point communication between devices. The method comprises generating a frame with information indicating in which time division duplex (TDD) time slots, in a service period (SP) within a data transfer interval (DTI) of the frame, another apparatus is allowed to communicate. The method further comprises outputting the frame for transmission.

29 Claims, 25 Drawing Sheets

(51) Int. Cl.
*H04L 5/00* (2006.01)
*H04L 5/14* (2006.01)
*H04W 72/04* (2009.01)
*H04W 92/18* (2009.01)

(52) U.S. Cl.
CPC .......... *H04L 5/0092* (2013.01); *H04L 5/0096* (2013.01); *H04L 5/14* (2013.01); *H04L 5/1469* (2013.01); *H04W 72/0446* (2013.01); *H04W 92/18* (2013.01)

(56) References Cited

U.S. PATENT DOCUMENTS

| | | | |
|---|---|---|---|
| 2017/0195035 A1* | 7/2017 | Calcev | H04B 7/0452 |
| 2018/0092128 A1 | 3/2018 | Um et al. | |
| 2018/0206139 A1* | 7/2018 | Wang | H04B 7/15507 |
| 2019/0182089 A1* | 6/2019 | Yun | H04L 27/2613 |
| 2019/0208463 A1* | 7/2019 | Lou | H04B 7/0413 |
| 2019/0281657 A1* | 9/2019 | Kim | H04B 7/0452 |
| 2019/0335455 A1* | 10/2019 | Legg | H04W 72/1252 |

OTHER PUBLICATIONS

Partial International Search Report—PCT/US2018/044851—ISA/EPO—Nov. 13, 2018.

\* cited by examiner

Extended Schedule Element 1000

EXAMPLE ALLOCATION TYPE FIELD VALUES

| Bit 4 | Bit 5 | Bit 6 | Meaning |
|---|---|---|---|
| 0 | 0 | 0 | SP allocation |
| 1 | 0 | 0 | CBAP allocation |
| All other combinations | | | TDD-SP ALLOCATION |

EXAMPLE BLOCK ACK POLICY

| Bits in QoS Control field | | Meaning |
|---|---|---|
| Bit 5 | Bit 6 | |
| 0 | 0 | When operating in DMG TDD-SP mode, ACK is sent a certain number of interval later |

FIG. 14

| Fields: | Element ID ⌐1802 | Length ⌐1804 | Length of Slot Polarity Bitmap ⌐1806 | Allocation ID ⌐1808 | Slot Duration ⌐1810 | Slot Polarity Bitmap ⌐1812 |
|---|---|---|---|---|---|---|
| Bits | 8 | 8 | 4 | 4 | 8 | L |
| Usage: | Value TBD | Value depends on length of the Slot Polarity Bitmap field in this IE | Value denoted as L. Range of L is 1 to 16 (i.e. L is equal to the bit representation + 1) | Takes the same value as the Allocation ID subfield in the Allocation Field of the SP allocation for which this IE provides Slot structure information | Represents slot duration in increments of 4us. Value is (bit representation+1)*4us. Range is 4us to 1.024ms. All Slots have equal duration. Corresponding SP duration should be integral multiple of this value. | 0: Tx Polarity 1: Rx Polarity Denotes the repeating pattern of Polarity starting at the first Slot within the TDD Operation SP allocation |

| Fields: | Element ID | Length | No. of TDD Operation SPs addressed | TDD Operation SP Start Time | Bitmap |
|---|---|---|---|---|---|
| Bits | 8 | 8 | 10 | 64 | L |
| Usage: | Value TBD | Value depends on length of the Bitmap field in this IE | Value denoted as L. Range of L is 1 to 1024 | This indicates the time in us between TSF 0 and start of the first TDD Operation SP from which point on, the Bitmap takes effect | 1: node will TX or RX to the neighbor receiving this IE<br><br>0: node will not TX or RX to the neighbor receiving this IE |

Columns labeled 1902, 1904, 1906, 1908, 1910. Table 1900.

FIG. 19

| | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| Schedule: (X → Y means X transmits and Y receives) | A → B | A → C | A → D | B → A | C → A | D → A | A → B | A → B | A → B | B → A |

| | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|
| Schedule | A → B | A → C | A → D | B → A | C → A | D → A | A → B | A → B | A → B | B → A |
| Bitmap in the IE from A to B | 1 | 0 | 0 | 1 | 0 | 0 | 1 | 1 | 1 | 1 |
| Bitmap in the IE from A to C | 0 | 1 | 0 | 0 | 1 | 0 | 0 | 0 | 0 | 0 |
| Bitmap in the IE from A to D | 0 | 0 | 1 | 0 | 0 | 1 | 0 | 0 | 0 | 0 |

TIME DIVISION DUPLEXED (TDD) SERVICE PERIOD

CROSS-REFERENCE TO RELATED APPLICATIONS

This application claims the benefit of U.S. Application Ser. No. 62/540,460 entitled "TIME DIVISION DUPLEXED (TDD) SERVICE PERIOD," which was filed Aug. 2, 2017 as well as U.S. Application Ser. No. 62/548,938 entitled "TIME DIVISION DUPLEXED (TDD) SERVICE PERIOD," which was filed Aug. 22, 2017. The aforementioned applications are herein incorporated by reference in their entirety.

FIELD

Certain aspects of the present disclosure generally relate to wireless communications and, more particularly, to distribution networks that utilize point-to-point communication between devices.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a frame with information indicating in which time division duplex (TDD) time slots, in a service period (SP) within a data transfer interval (DTI) of the frame, another apparatus is allowed to communicate, and at least one interface configured to output the frame for transmission Certain aspects of the present disclosure provide an apparatus for wireless communications. The apparatus generally at least one interface configured to obtain a frame with information indicating in which time division duplex (TDD) time slots, in a service period (SP) within a data transfer interval (DTI) of the frame, the apparatus is allowed to communicate, and a processing system configured to communicate, via the at least one interface, with at least one other apparatus in the indicated TDD time slots during the SP.

Certain aspects of the present disclosure provide an apparatus for wireless communications. The apparatus generally at least one interface and a processing system configured to determine a configuration for communicating in a distribution network without performing secure network association, and communicate in the distribution network, by an exchange of frames, in accordance with the configuration.

Certain aspects of the present disclosure provide method for wireless communications by an apparatus, comprising generating a frame with information indicating in which time division duplex (TDD) time slots, in a service period (SP) within a data transfer interval (DTI) of the frame, another apparatus is allowed to communicate and outputting the frame for transmission.

Certain aspects of the present disclosure provide a method for wireless communications by an apparatus, comprising obtaining a frame with information indicating in which time division duplex (TDD) time slots, in a service period (SP) within a data transfer interval (DTI) of the frame, the apparatus is allowed to communicate, and communicating with at least one other apparatus in the indicated TDD time slots during the SP.

Certain aspects of the present disclosure provide a method for wireless communications by an apparatus, comprising determining a configuration for communicating in a distribution network without performing secure network association, and communicating in the distribution network, by an exchange of frames, in accordance with the configuration.

Certain aspects of the present disclosure provide an apparatus for wireless communications, comprising means for generating a frame with information indicating in which time division duplex (TDD) time slots, in a service period (SP) within a data transfer interval (DTI) of the frame, another apparatus is allowed to communicate; and means for outputting the frame for transmission.

Certain aspects of the present disclosure provide an apparatus for wireless communications, comprising means for obtaining a frame with information indicating in which time division duplex (TDD) time slots, in a service period (SP) within a data transfer interval (DTI) of the frame, the apparatus is allowed to communicate; and means for communicating with at least one other apparatus in the indicated TDD time slots during the SP.

Certain aspects of the present disclosure provide an apparatus for wireless communications, comprising means for determining a configuration for communicating in a distribution network without performing secure network association, and means for communicating in the distribution network, by an exchange of frames, in accordance with the configuration.

Certain aspects of the present disclosure provide a processing system configured to generate a frame with information indicating in which time division duplex (TDD) time slots, in a service period (SP) within a data transfer interval (DTI) of the frame, another wireless device is allowed to communicate, and a transmitter configured to transmit the frame for transmission.

Certain aspects of the present disclosure provide a wireless station, comprising a transceiver configured to receive a frame with information indicating in which time division duplex (TDD) time slots, in a service period (SP) within a data transfer interval (DTI) of the frame, the wireless station is allowed to communicate; and a processing system configured to communicate, via the transceiver, with at least one other apparatus in the indicated TDD time slots during the SP.

Certain aspects of the present disclosure provide a wireless station, comprising transceiver, and a processing system configured to determine a configuration for communicating in a distribution network without performing secure network association, and communicate in the distribution network, by an exchange of frames via the transceiver, in accordance with the configuration. Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 14 illustrates an example block acknowledgment policy, in accordance with certain aspects of the present disclosure.

FIG. 18 illustrates an example information element (IE) for defining a structure and schedule of the SP of FIG. 15, in accordance with certain aspects of the present disclosure.

FIG. 19 illustrates an example IE for defining a structure and schedule of the SP of FIG. 15, in accordance with certain aspects of the present disclosure.

DETAILED DESCRIPTION

Figure 1:
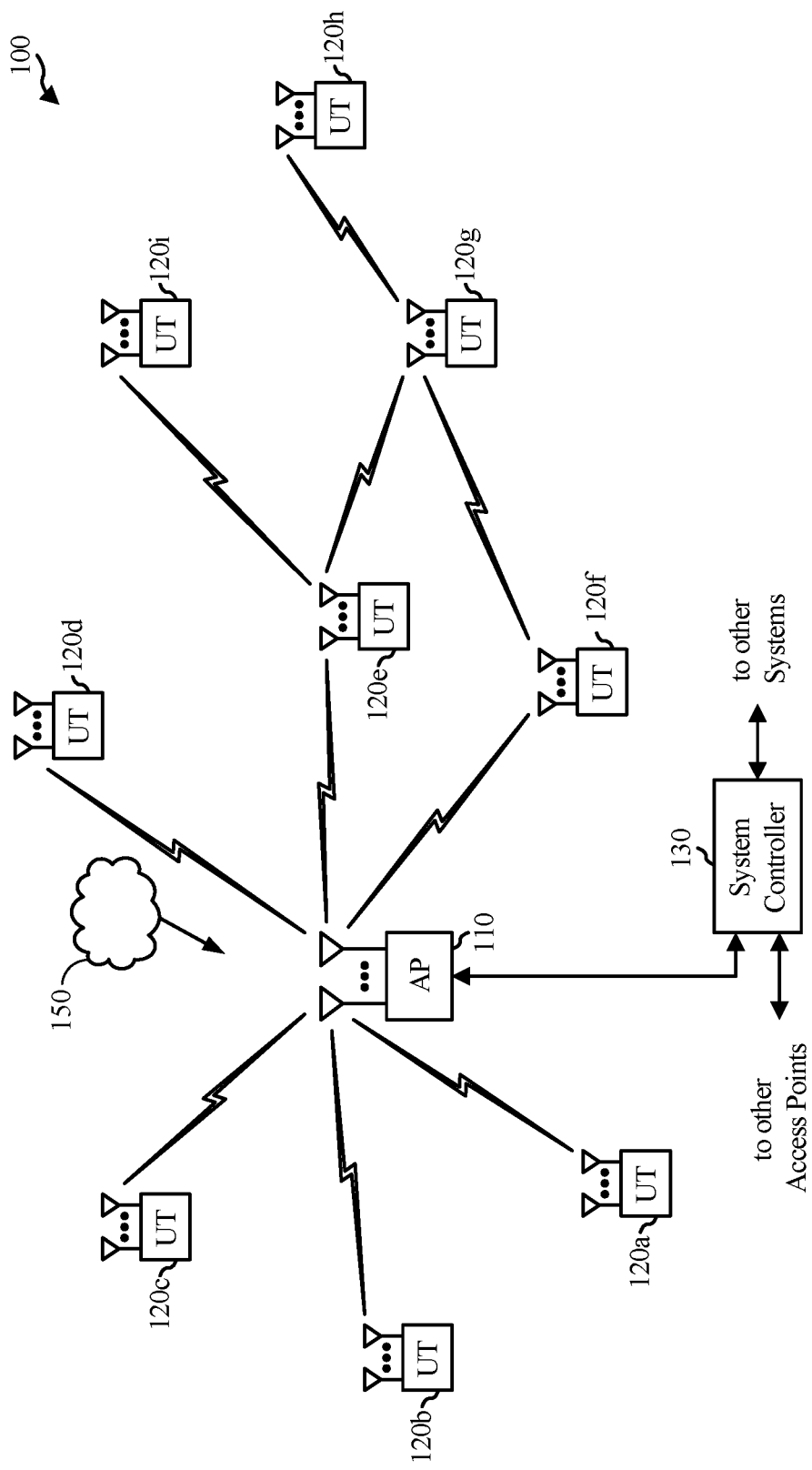
FIG. 1 is a diagram of an example wireless communications network, in accordance with certain aspects of the present disclosure.

Certain aspects of the present disclosure provide methods and apparatus relating to distribution networks that utilize point-to-point communication between devices.

Distribution nodes (DNs) operating in the 60 GHz spectrum may conform to the 802.11ad and 802.11ay standards. For example, 802.11ad provides a certain frame format that may be utilized by the nodes within the DN. More specifically, the media access control (MAC) protocol of 802.11ad provides a super-frame, called the beacon interval. As described above, in some embodiments, a DN may be a time division duplex (TDD) system. However, currently, 802.11ad and 802.11ay standards do not allow for TDD operation where time is divided into a slotted structure. In some embodiments, implementing a slotted operation may be advantageous because with a slotted operation, a scheduling algorithm may be used to determine which links (i.e. node pairs) are allowed to communicate in each slot. In addition, a slotted frame structure allows for a simpler and more efficient implementation of scheduling so as to manage interference and achieve high throughput.

Accordingly, certain embodiments described herein relate to modifications to the 802.11ad/ay standards by introducing a new service period (i.e., TDD-SP (time division duplexed-service period), as described below) within the DTI segment of the 802.11ad super-frame. In addition, in certain embodiments, an existing SP within the super-frame may be indicated as available for TDD operation, in which case the SP may be considered as being made up of a set of time slots (e.g., which may be grouped into different TDD intervals). Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
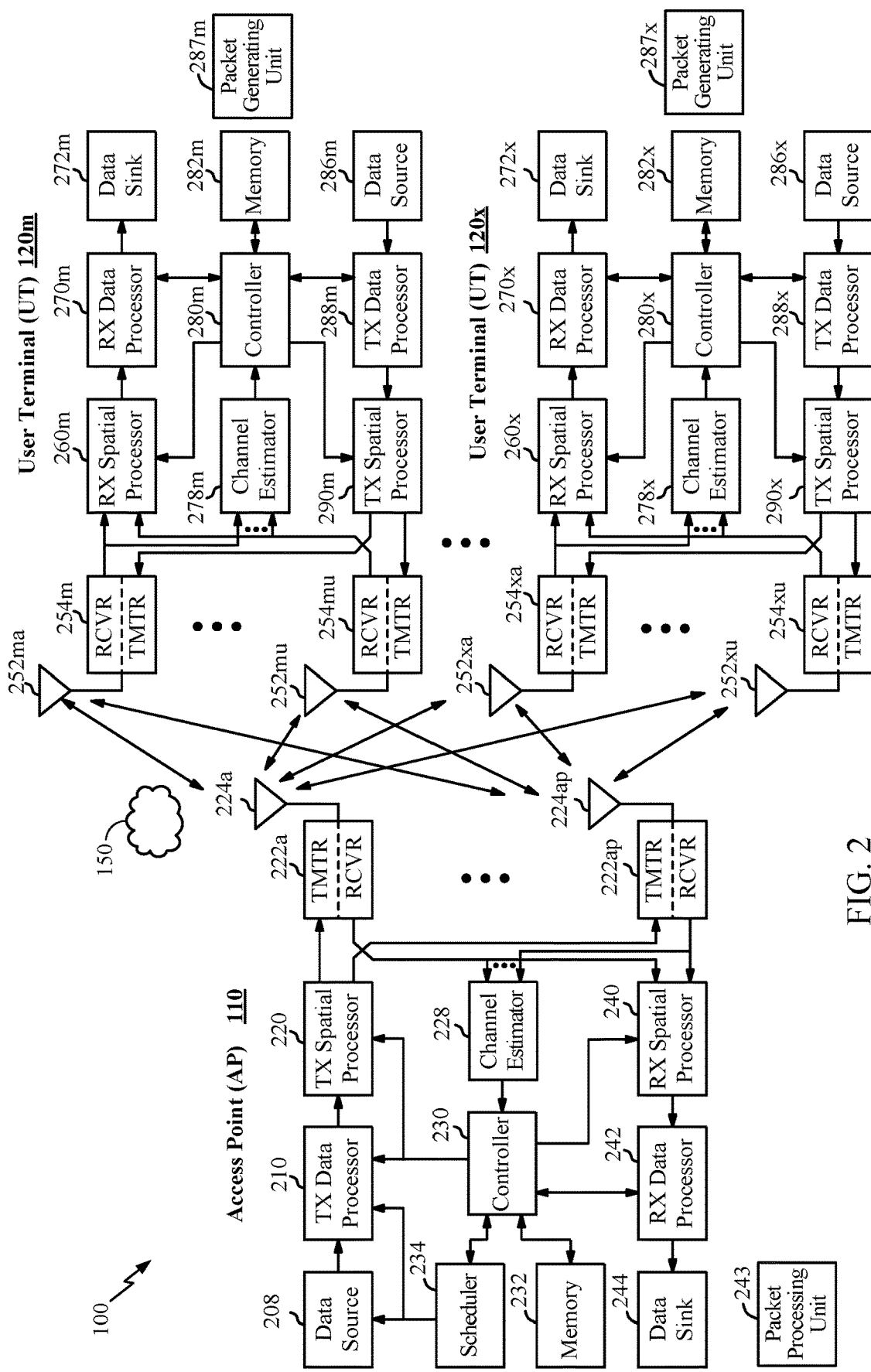
FIG. 2 is a block diagram of an example access point and example user terminals, in accordance with certain aspects of the present disclosure.

FIG. 2 illustrates a block diagram of access point 110 and two user terminals 120m and 120x in MIMO system 100.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-3B), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
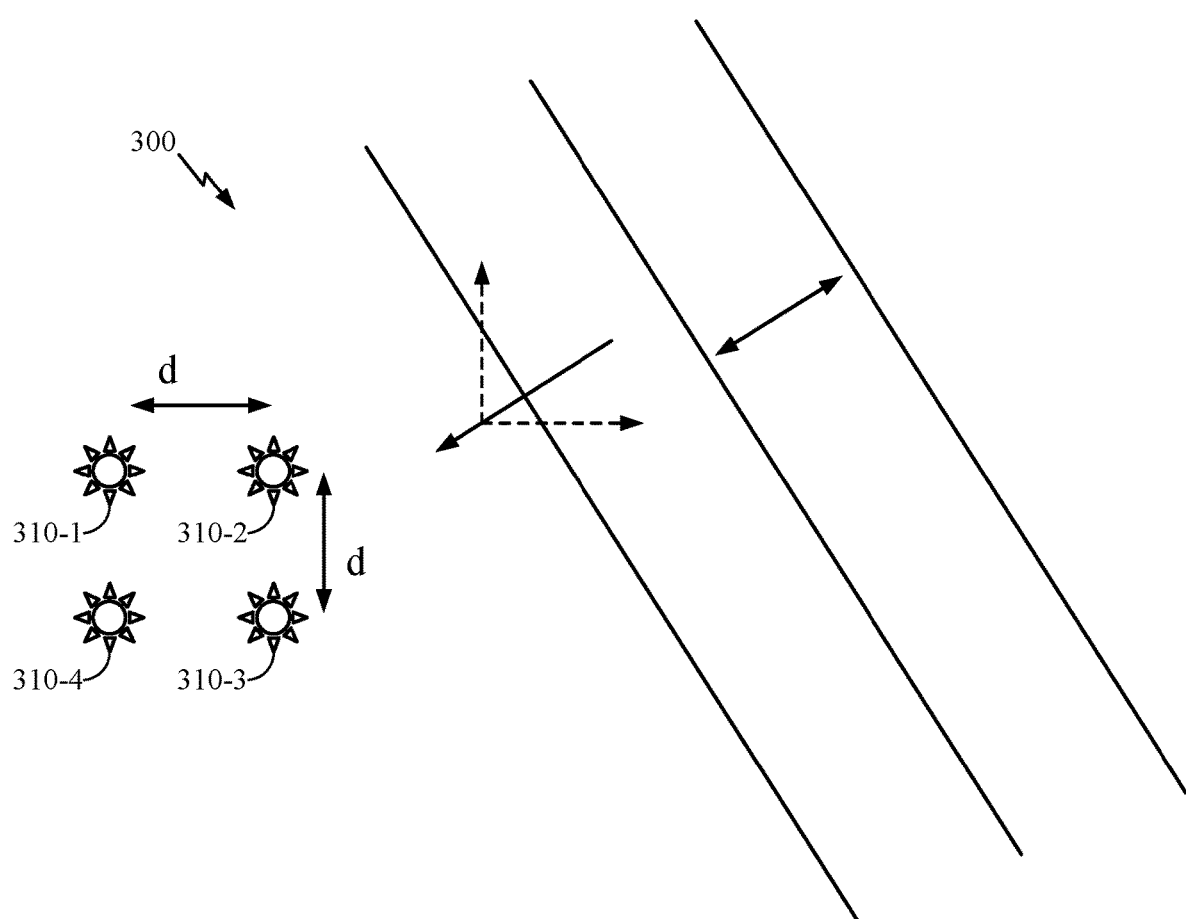
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings to achieve desired link budget for subsequent communication.

Example of Distribution Network in 60 GHz Spectrum

Aspects of the present disclosure may provide a distribution network (DN) support, for example, in a system in-line with an 802.11 standard for 60 GHz spectrum that currently lacks any such feature. Aspects of the present disclosure may provide secure network association services to a device seeking to join a DN and subsequent allocation of SPs to communicate between nodes in the DN to eliminate interference (e.g., using simplex communication).

Figure 4:
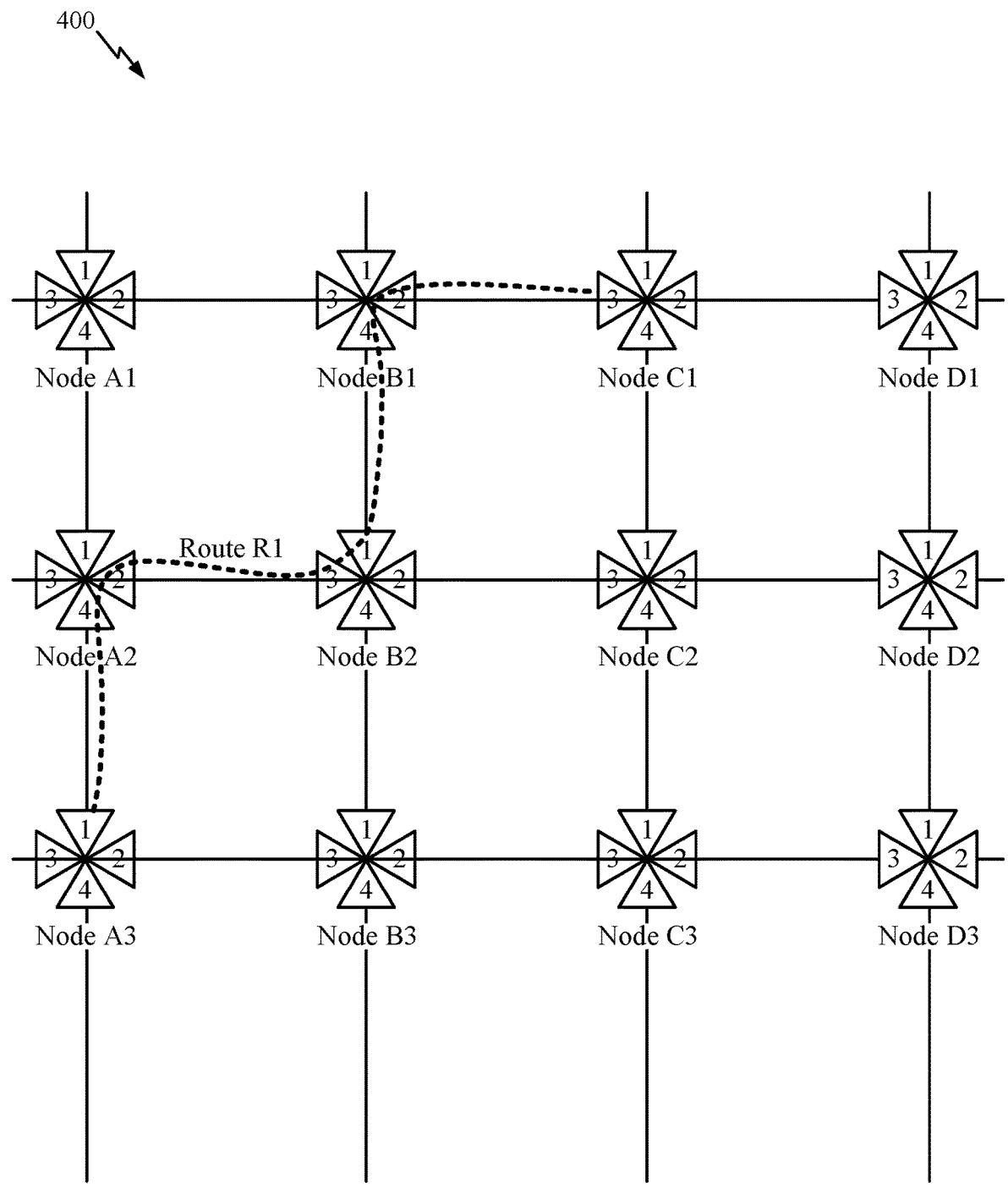
FIG. 4 illustrates an example of a distributed network in which aspects of the present disclosure may be practiced.

As illustrated in FIG. 4, a DN 400 may be formed by DN nodes each comprising one or more non access point (non-AP) stations (STAs). The DN nodes may communicate using point-to-point (e.g., 802.11ad) links between STAs, with routing functions provided by protocols above a certain load lock calibration (LLC) level.

In the example illustrated in FIG. 4, DN 400 includes Nodes A1-D3, each node including multiple stations. The stations may be oriented to optimize communications in a given direction, with the group of stations providing collective "omnidirectional" coverage. In DN 400, each node contains 4 stations STA1, STA2, STA3, and STA4. The STAs may have physical or virtual instantiation (meaning the STAs may have separate hardware components and physical resources or they may share resources as virtual STAs). Each STA may have its own MAC address locally or globally administered (and the routing functionality may be provided by mapping IP addresses to MAC addresses).

As illustrated, in some cases, only one STA of each node may be used to connect to any one other node. For example, STA3 of Node A1 is used to connect to STA3 of Node B1, while STA4 of Node A1 is used to connect to STA1 of Node A2. STAs not connected to another node may act as an access point (e.g., providing secure network association services to joining nodes, as described below).

In some cases, a route that communicates between two end nodes may be provided such that as few other nodes as possible are crossed in the DN 400. For example, as shown, to connect Node A3 with Node C1, a Route R1 may be provided that crosses Nodes A2, B2, and B1. As noted above, each node may provide layer 3 routing to communicate between end points. DN timing may be synchronized in any suitable manner, for example, via GPS or some other type of independent clock source.

Example Time Division Duplexed Service Period (TDD-SP) Support

Figure 5:
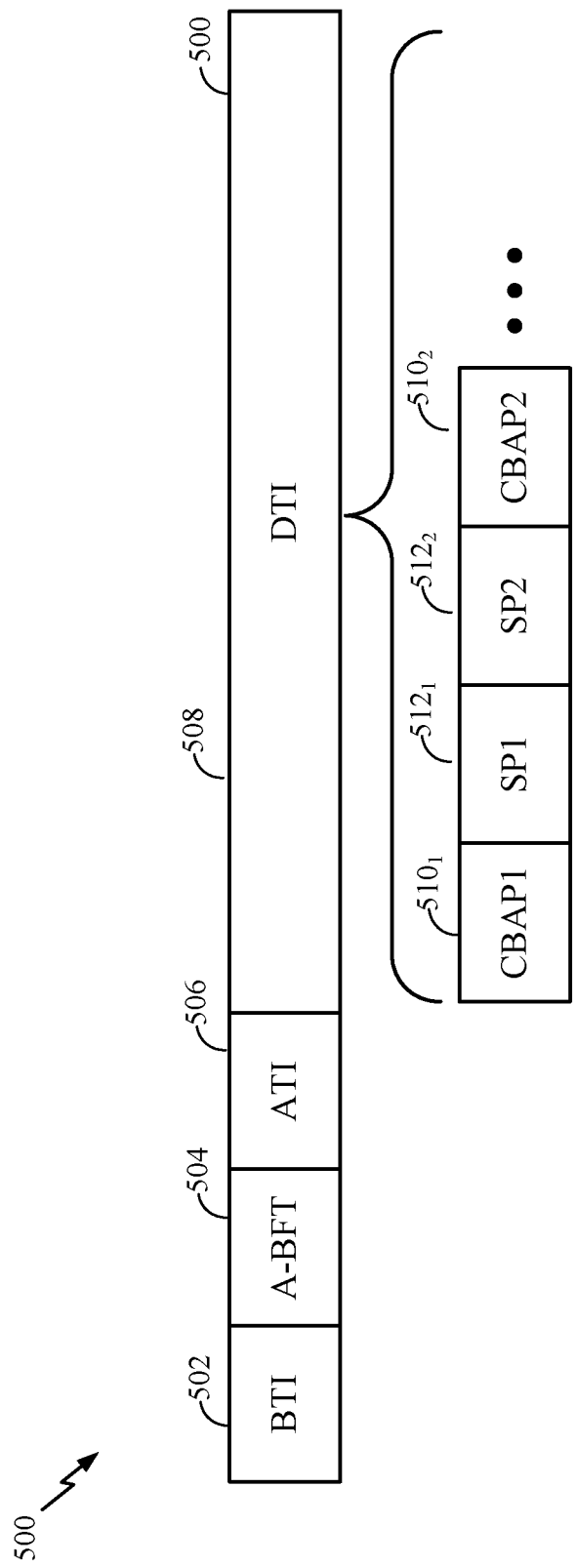
FIG. 5 illustrates an example frame structure, in accordance with certain aspects of the present disclosure.

As described above, DNs operating in the 60 GHz spectrum may conform to the 802.11ad and 802.11ay standards. For example, 802.11ad provides a certain frame format that may be utilized by the nodes within the DN. More specifically, as shown in FIG. 5, the media access control (MAC) protocol of 802.11ad provides a super-frame 500, called the beacon interval, that comprises a beacon transmission interval (BTI) 502, a data transfer interval (DTI) 508, as well as optional association beamforming training (A-BFT) 504 and/or announcement transmission intervals (ATI) 506. DTI 508, as shown, may include one or more service periods (SPs) 512, which help with mitigating interference among nodes within a DN (e.g., DN 400 of FIG. 4). DTI 508 may also include one or more contention-based access periods 510.

As described above, in some embodiments, a DN (e.g., DN 400 of FIG. 4) may be a time division duplex (TDD) system. However, currently, 802.11ad and 802.11ay standards do not allow for TDD operation where time is divided into a slotted structure. In some embodiments, implementing a slotted operation may be advantageous because with a slotted operation, a scheduling algorithm may be used to determine which links (i.e. node pairs) are allowed to communicate in each slot. In addition, a slotted frame structure allows for a simpler and more efficient implementation of scheduling so as to manage interference and achieve high throughput.

Accordingly certain embodiments described herein relate to introducing a new service period (i.e., TDD-SP (time division duplexed-service period), as described below) within the DTI segment of a superframe. Also certain embodiments described herein relate to operating a SP within the DTI segment of a superframe as a TDD SP.

Figure 6:
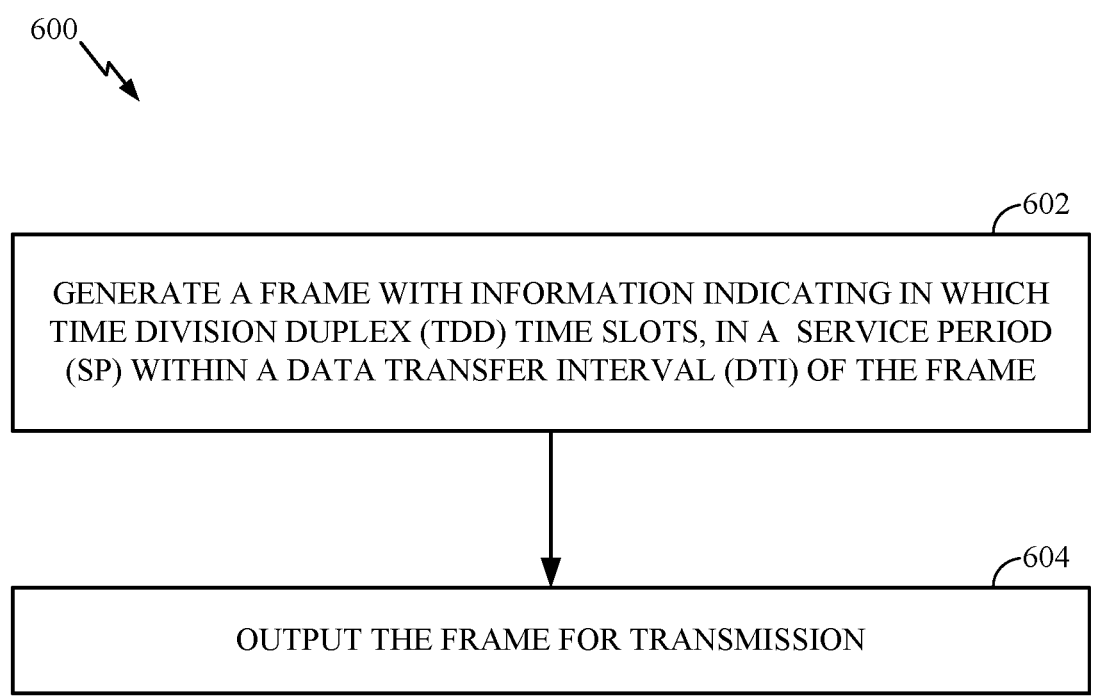
FIG. 6 illustrates example operations for wireless communications, in accordance with certain aspects of the present disclosure.

FIG. 6 illustrates example operations 600 for use by a wireless device within a DN (e.g., DN 400), according to aspects of the present disclosure. Operations 600 begin, at 602, by generating a frame with information indicating in which time division duplex (TDD) time slots, in a service period (SP) within a data transfer interval (DTI) of the frame, another apparatus is allowed to communicate. At 604, operations 600 continue by outputting the frame for transmission.

Figure 6A:
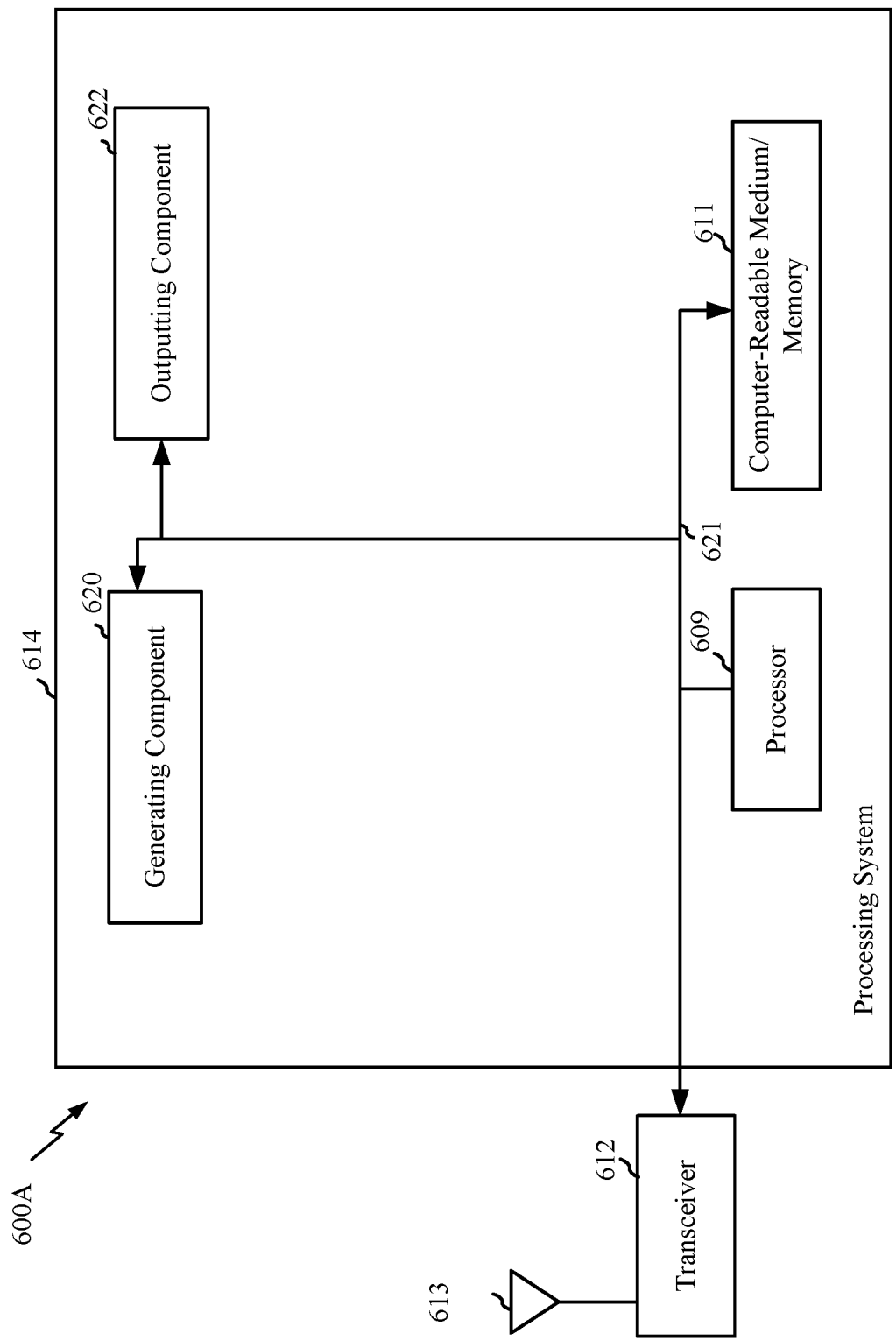
FIG. 6A illustrates a wireless communications device that may include various components configured to perform operations for the techniques disclosed herein, such as one or more of the operations illustrated in FIG. 6.

FIG. 6A illustrates a wireless communications device 600A that may include various components (e.g., corresponding to means-plus-function components) configured to perform operations for the techniques disclosed herein, such as one or more of the operations illustrated in FIG. 6. The communications device 600A includes a processing system 614 coupled to a transceiver 612. The transceiver 612 is configured to transmit and receive signals for the communications device 600A via an antenna 613. The processing system 614 may be configured to perform processing functions for the communications device 600A, such as processing signals, etc.

The processing system 614 includes a processor 609 coupled to a computer-readable medium/memory 611 via a bus 621. In certain aspects, the computer-readable medium/memory 611 is configured to store instructions that when executed by processor 609, cause the processor 609 to perform one or more of the operations illustrated in FIG. 6, or other operations for performing the various techniques discussed herein.

In certain aspects, the processing system 614 further includes a generating component 620 for performing one or more of the operations illustrated at 602 in FIG. 6. Additionally, the processing system 614 includes an outputting component 622 for performing one or more of the operations illustrated at 604 in FIG. 6.

The generating component 620 and the outputting component 622 may be coupled to the processor 609 via bus 621. In certain aspects, generating component 620 and the outputting component 622 may be hardware circuits. In certain aspects, generating component 620 and the outputting component 622 may be software components that are executed and run on processor 609.

Figure 7:
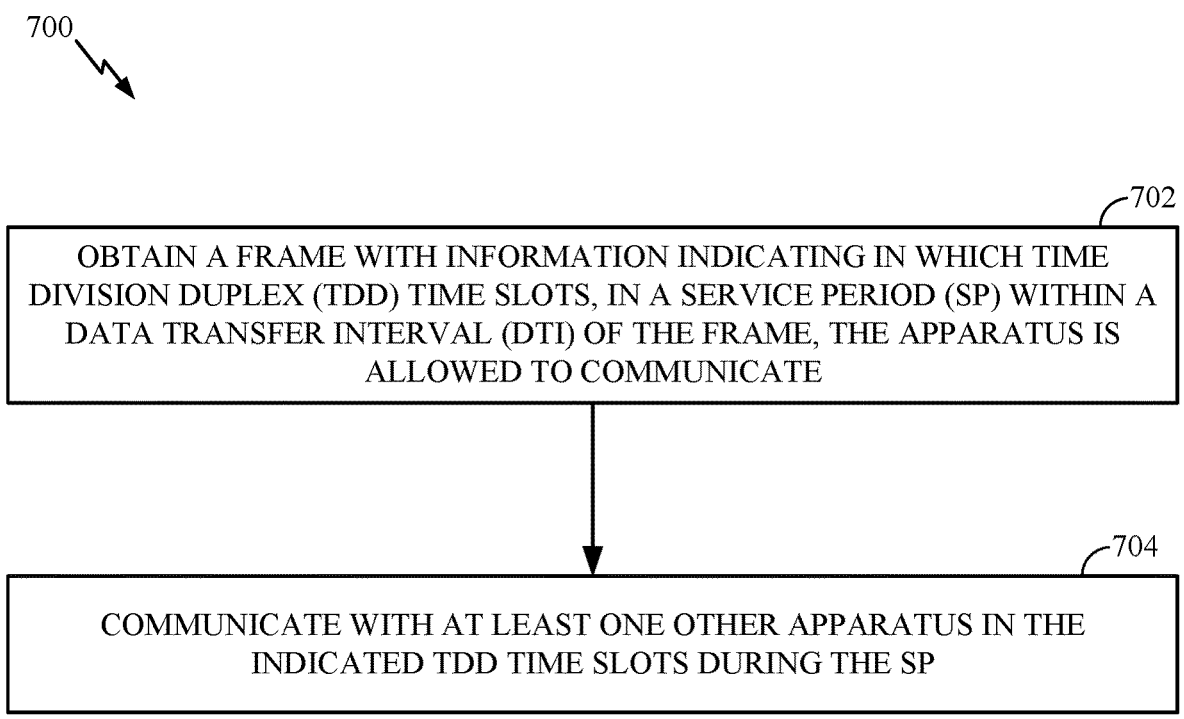
FIG. 7 illustrates example operations for wireless communications, in accordance with certain aspects of the present disclosure.

FIG. 7 illustrates example operations 700 for use by a wireless device within a DN (e.g., DN 400), according to aspects of the present disclosure. Operations 700 may be performed, for example, by a device configured for TDD-SP operation by a device performing operations 600.

Operations 700 begin, at 702, by obtaining a frame with information indicating in which time division duplex (TDD) time slots, in a service period (SP) within a data transfer interval (DTI) of the frame, the apparatus is allowed to communicate. At 704, operations 700 continue by communicating with at least one other apparatus in the indicated TDD time slots during the SP.

Figure 7A:
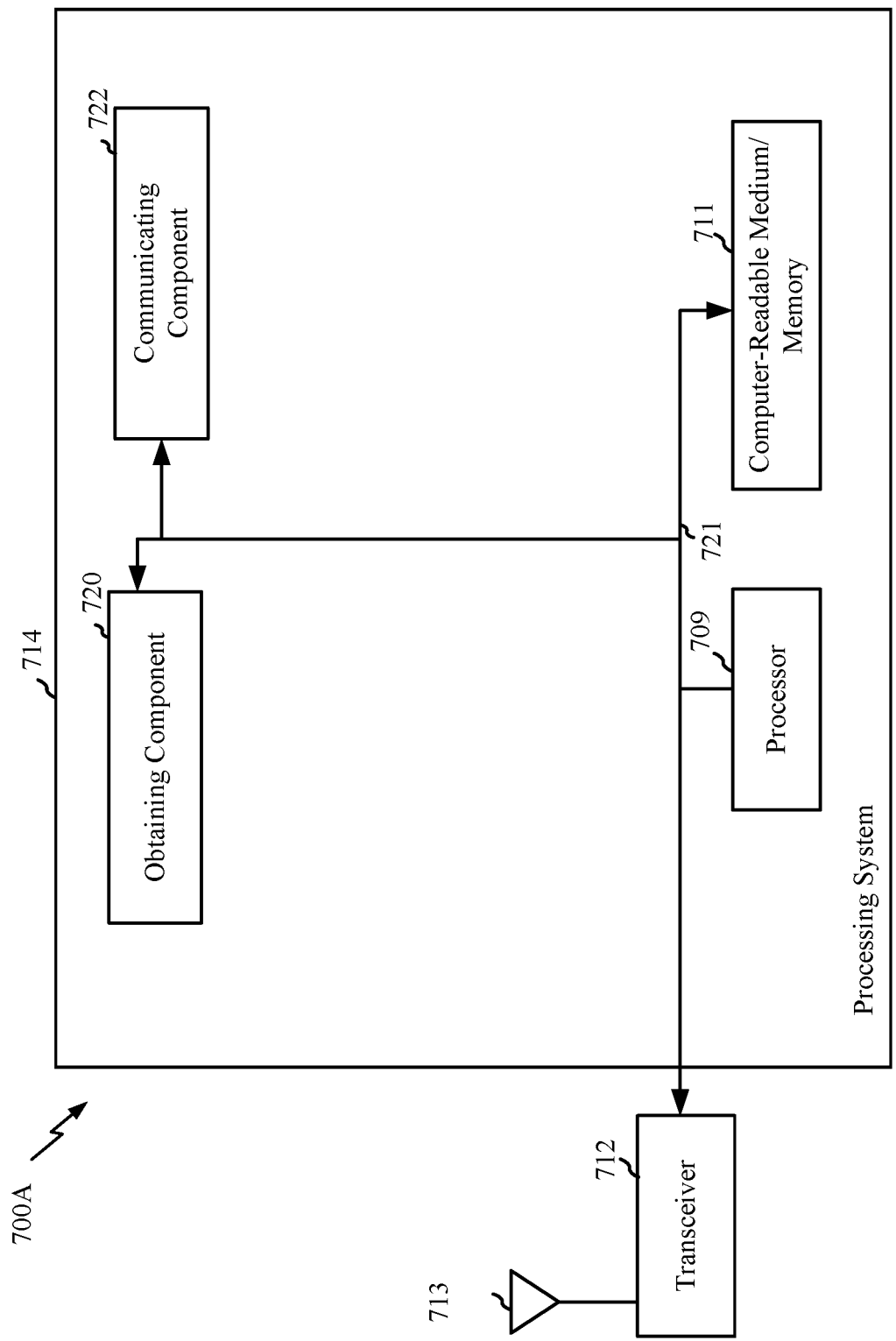
FIG. 7A illustrates a wireless communications device that may include various components configured to perform operations for the techniques disclosed herein, such as one or more of the operations illustrated in FIG. 7.

FIG. 7A illustrates a wireless communications device 700A that may include various components (e.g., corresponding to means-plus-function components) configured to perform operations for the techniques disclosed herein, such as one or more of the operations illustrated in FIG. 7. The communications device 700A includes a processing system 714 coupled to a transceiver 712. The transceiver 712 is configured to transmit and receive signals for the communications device 700A via an antenna 713. The processing system 714 may be configured to perform processing functions for the communications device 700A, such as processing signals, etc.

The processing system 714 includes a processor 709 coupled to a computer-readable medium/memory 711 via a bus 721. In certain aspects, the computer-readable medium/memory 711 is configured to store instructions that when executed by processor 709, cause the processor 709 to perform one or more of the operations illustrated in FIG. 7, or other operations for performing the various techniques discussed herein.

In certain aspects, the processing system 714 further includes an obtaining component 720 for performing one or more of the operations illustrated at 702 in FIG. 7. Additionally, the processing system 714 includes a communicating component 722 for performing one or more of the operations illustrated at 704 in FIG. 7. Further, communications device 700A comprises means for identifying, which may include processor 709 of processing system 714.

The obtaining component 720 and the communicating component 722 may be coupled to the processor 709 via bus 721. In certain aspects, obtaining component 720 and the communicating component 722 may be hardware circuits. In certain aspects, obtaining component 720 and the communicating component 722 may be software components that are executed and run on processor 709.

Figure 8:
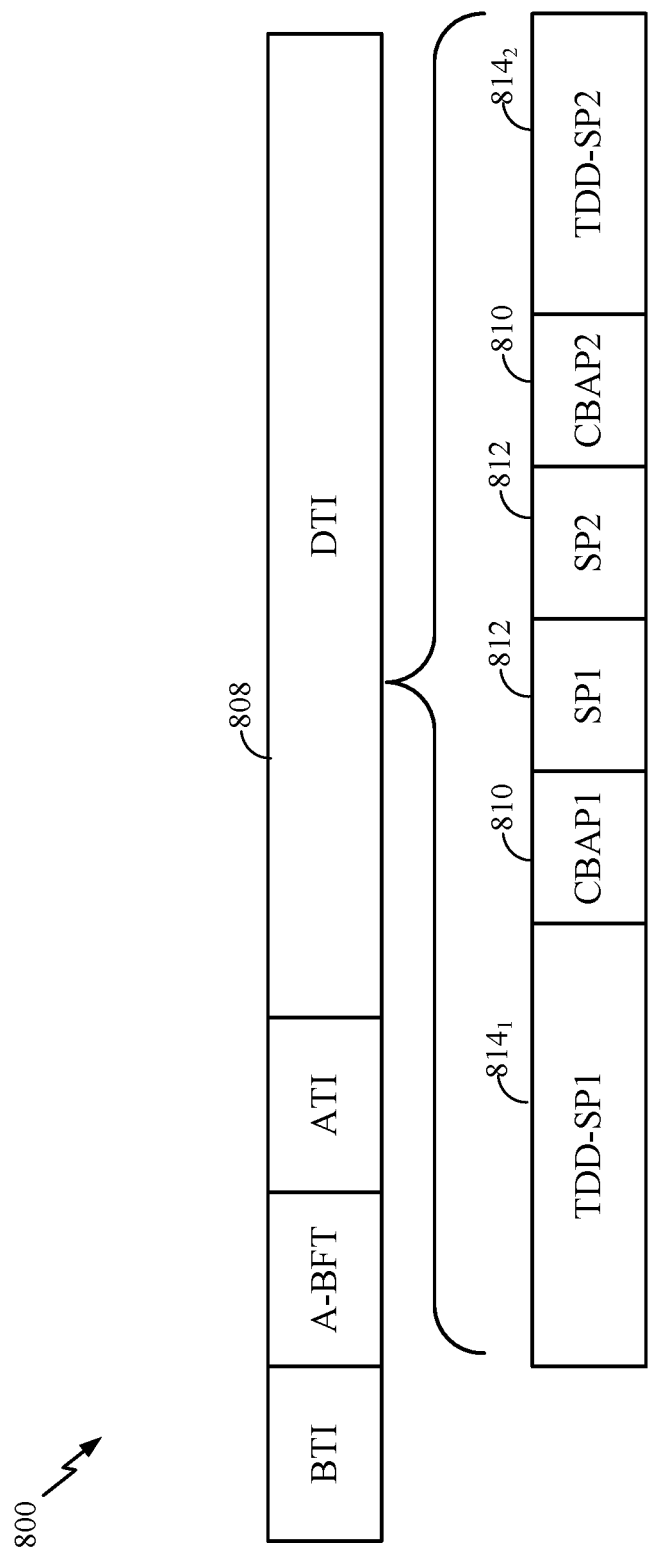
FIG. 8 illustrates an example of a time division duplexed (TDD) service period (SP), in accordance with certain aspects of the present disclosure.

As described above, in some embodiments, a new service period, a TDD-SP, may be defined for use in the DTI segment of the beacon interval provided by the MAC protocol of 802.11ad. FIG. 8 illustrates an example of introducing one or more TDD-SPs 814 in DTI 808 of the super-frame or beacon interval 800. For example, TDD-SP1 814$_1$ and TDD-SP2 814$_2$ may be added to the one or more CBAPs 810 and SPs 812 in DTI 808.

Figure 9:
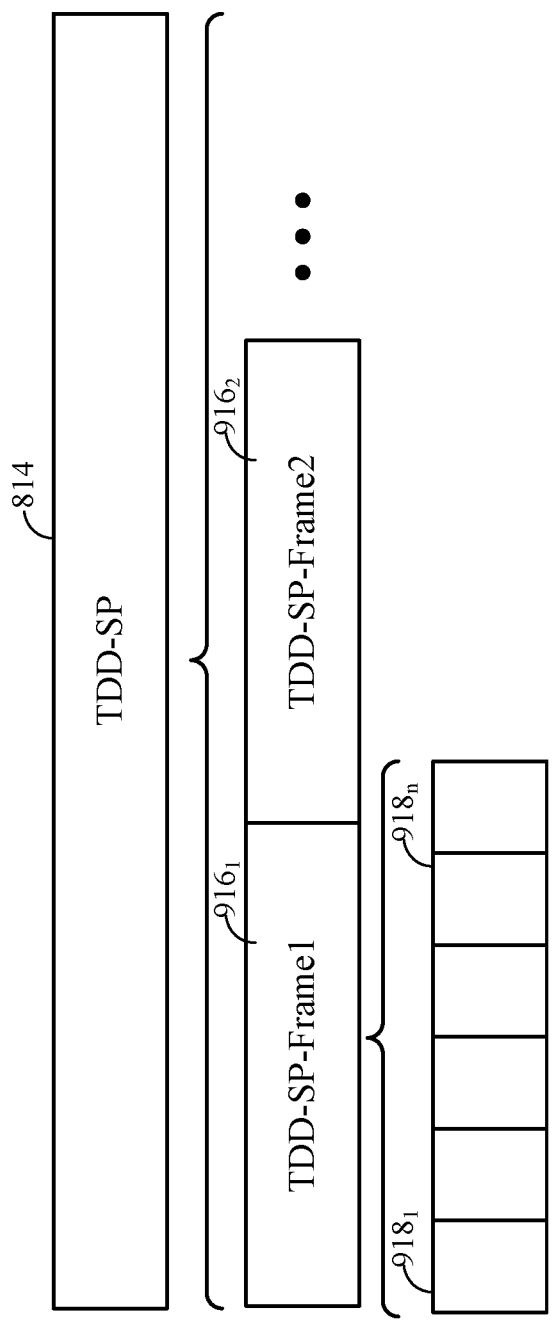
FIG. 9 illustrates an example TDD-SP frame, in accordance with certain aspects of the present disclosure.

In some embodiments, each TDD-SP comprises of one or more TDD-SP frames (e.g., intervals), where each TDD-SP frame further comprises one or more time slots. In some embodiments, the number of time slots may be fixed. FIG. 9 illustrates an example of a TDD-SP 814 having a number of TDD-SP frames 916 (e.g., TDD-SP-Frame1 916$_1$, TDD-SP-Frame2 916$_2$, etc.). FIG. 9 also illustrates a TDD-SP-Frame 916$_1$ having a number of slots 918. In some embodiments, the duration of the TDD-SP 814 may be an integer multiple of the duration of the TDD-SP-Frame 916.

Figure 10:
FIG. 10 illustrates an example extended schedule element, in accordance with certain aspects of the present disclosure.

Under the 802.11ad/ay standards, an Extended Schedule Element (ESE) may be communicated by the various nodes within a DN. The ESE may comprise a number of allocation field, each including scheduling information for a corresponding allocation in the DTI. For example, as shown in FIG. 10, an ESE may utilize a three-bit value for indicating the allocation type of a corresponding period in the DTI. In some embodiments, as further shown in FIG. 16, the three bit value may be conveyed in an allocation type subfield that is part of an allocation control subfield of an allocation field of the corresponding period in the DTI.

As shown in FIG. 10, in some embodiments, bits 4, 5, and 6 of each allocation control field of an allocation field in the ESE 1000 may be used for indicating the allocation type of a corresponding period in the DTI. Each bit combination may indicate a different allocation type. As an example, a 0-0-0 bit sequence in an allocation type field indicates an SP allocation while a 1-0-0 bit sequence indicates a CBAP allocation. In some embodiments, in order to indicate a TDD-SP allocation type, a bit sequence from a pool of reserved bit sequences in the ESE 1000 (e.g., a bit sequence other than 000 or 100) may be used. For example, bit sequence 1-0-1 may be used as an allocation type field value to indicate a TDD-SP allocation.

In addition, in some embodiments, a new information element (IE) may be introduced such that every TDD-SP may have a corresponding IE for providing information about the different parameters of the TDD-SP (e.g., one or more parameters describing time slots of the first TDD SP). For example, the IE may comprise an allocation ID field that indicates an identification of the TDD-SP to which the following parameters in the IE apply, a TDD-SP-Frame duration field that indicates the duration of a TDD-SP-Frame in the TDD-SP in micro seconds, a TDD-SP slot duration field that indicates the duration of each TDD-SP slot in the TDD-SP, a number of even polarity slots in a TDD-SP-Frame (e.g., in some cases, each TDD-SP spans multiple frames), a number of odd polarity slots in a TDD-SP-Frame, the polarity of the first time slot (e.g., a time slot occurring at a beginning) of the TDD-SP, and slots permitted to be used for sending upper layer management frames to unassociated nodes.

Figure 11:
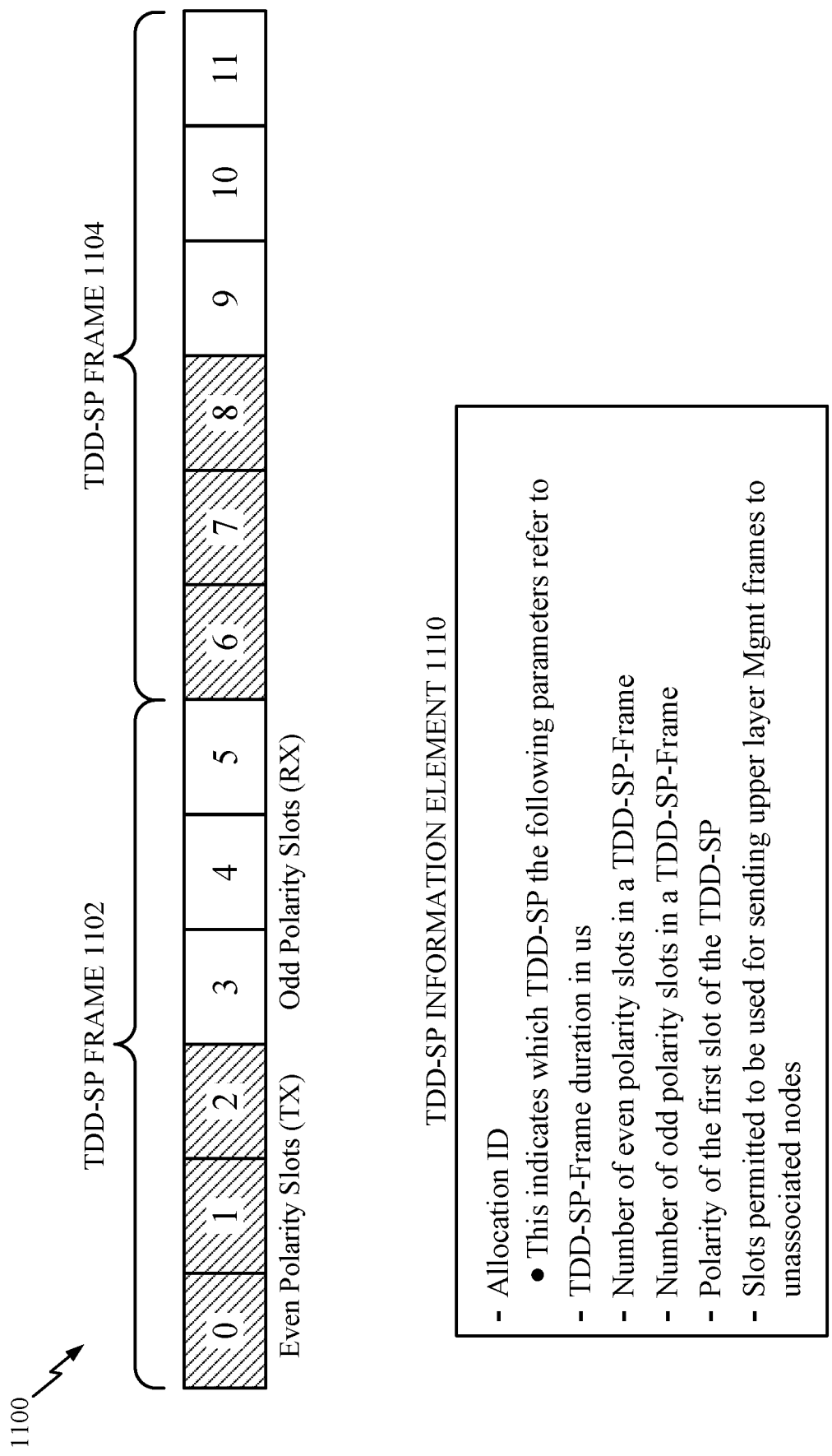
FIG. 11 illustrates an example TDD-SP frame and information element (IE), in accordance with certain aspects of the present disclosure.
Figure 11A:
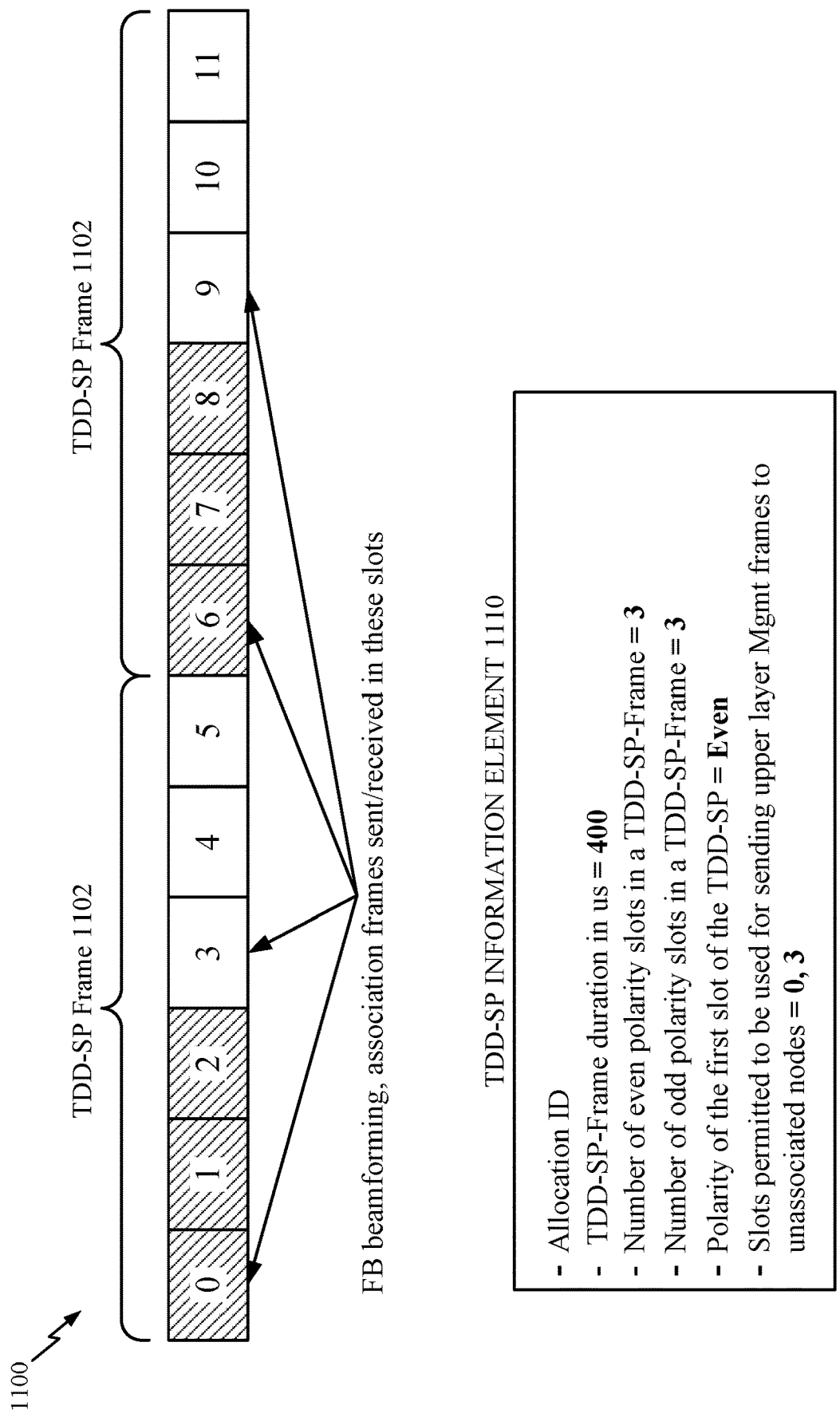
FIG. 11A illustrates a TDD-SP frame and corresponding IE with a first set of example values, in accordance with certain aspects of the present disclosure.

FIG. 11 illustrates an example of a TDD-SP 1100, including TDD-SP frames 1102 and 1104, with a corresponding IE 1110, which includes the fields described above. FIG. 11A illustrates example values that the fields of IE 1110 of FIG. 11 may, in one example, comprise. For example, IE 1100 corresponding to the TDD-SP shown in FIG. 11A may indicate that the duration of each TDD-SP-Frame (e.g., TDD-SP-Frame 1102) in the TDD-SP is, for example, 400 micro seconds, the number of even polarity slots in each TDD-SP-Frame is 3 (the even polarity slots 0-2 and 6-8 are shown in orange), the number of odd polarity slots in each TDD-SP-Frame is 3 (the odd polarity slots 3-5 and 9-11 are shown in blue), the polarity of the first slot of the TDD-SP 1100 is even, and that slots 0 and 3 in TDD-SP-Frame 1102 are permitted to be used for sending/receiving upper layer management frames to/from unassociated nodes. Similarly, in some embodiments, slots 6 and 9 in TDD-SP-Frame 1104 are permitted to be used for sending/receiving upper layer management frames to/from unassociated nodes. In certain aspects, the polarity of a slot indicates the direction of traffic. As an example, if the wireless devices that is assigning the schedule takes the role of a transmitter in an even slot, the receiver of the schedule may take the role of a transmitter in an odd slot and vice versa.

Figure 12:
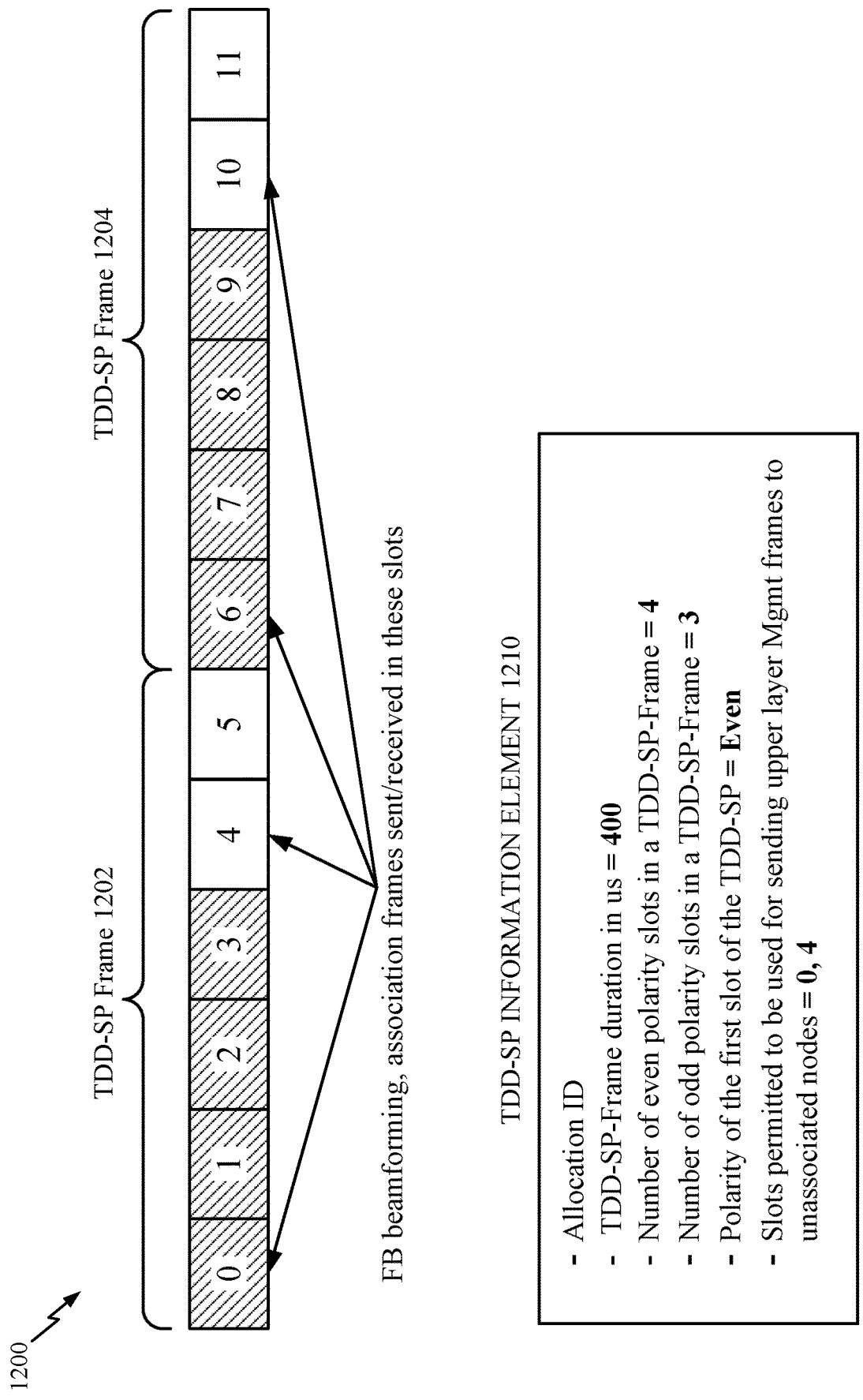
FIG. 12 illustrates an example TDD-SP and corresponding IE with a second set of example values, in accordance with certain aspects of the present disclosure.

FIG. 12 also illustrates another example TDD-SP 1200. As an example, an IE 1210 corresponding to the TDD-SP 1200 shown in FIG. 12 may indicate that each TDD-SP-Frame (e.g., TDD-SP-Frame 1202) in the TDD-SP has a duration of, for example, 400 micro seconds, the number of even polarity slots in each TDD-SP-Frame is 4 (the even polarity slots 0-4 and 6-9 are shown in orange), the number of odd polarity slots in each TDD-SP-Frame is 2 (the odd polarity slots 4-5 and 10-11 are shown in blue), the polarity of the first slot of the TDD-SP is even, and that slots 0 and 4 are permitted to be used for sending/receiving upper layer management frames to/from unassociated nodes.

Figure 13:
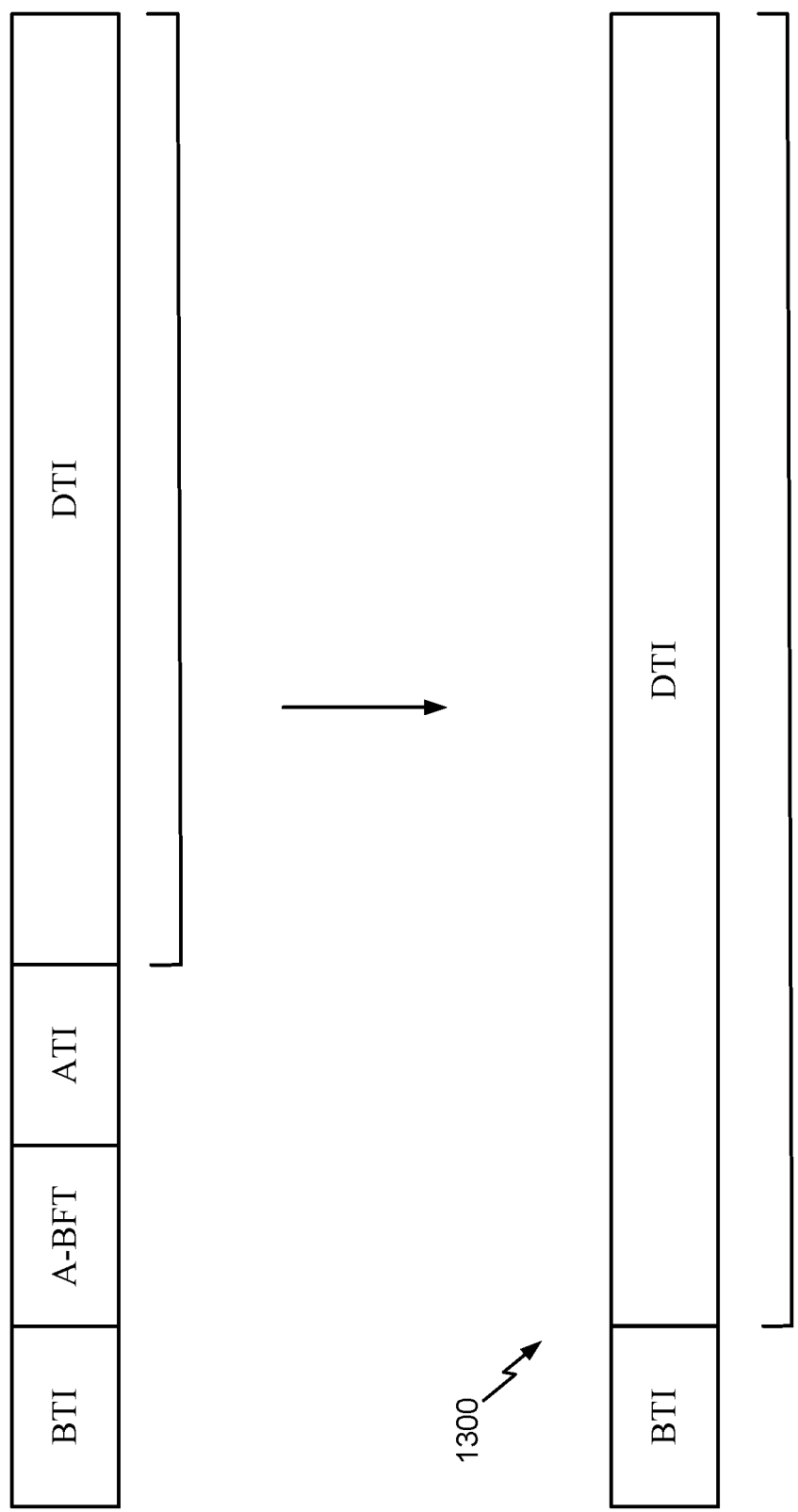
FIG. 13 illustrates an example TDD-SP superframe with certain fields removed, in accordance with certain aspects of the present disclosure.

As described above in relation to FIG. 5, a MAC protocol super-frame (e.g., super-frame 500 of FIG. 5) may, in addition to a BTI and a DTI, also comprise an A-BFT (e.g., A-BFT 504) and ATI (e.g., ATI 506). However, in some embodiments, the ABFT and/or ATI fields may be omitted to provide more time for data transmission, thereby extending the time allocated to DTI. FIG. 13 illustrates an example of a TDD SP 1300 without the A-BFT and ATI. As signaling already exists for omitting an ATI, in some embodiments, ATI may be removed by setting a bit corresponding to the presence of the ATI to zero. For example, a bit set to 1 within a DMG beacon indicates the presence of ATI in a corresponding beacon interval of the DMG beacon. Changing this bit from 1 to zero, in some embodiments, indicates that ATI is no longer present in the beacon interval. The bit that indicates ATI's presence may be found within the Beacon Interval Control (BIC) information field contained in the DMG beacon.

Moving now to A-BFT, in some embodiments, A-BFT may not be removed completely. In such embodiments, A-BFT may be delayed at most by 16 beacon intervals (BIs). Currently, under the 802.11ad/ay standards, there is a four-bit Next A-BFT field that indicates the number of beacon intervals during which A-BFT is not present. Accordingly, a Next A-BFT that is a set to 0 indicates that an A-BFT field is going to immediately follow the BTI in the beacon interval. In addition to the four-bit Next A-BFT, an N beacon intervals (BIs) A-BFT ("N BIs A-BFT") field may be used to identify the interval(s), in the number of BIs, at which a corresponding station (STA) sending the DMG beacons allocates an A-BFT. An N BIs A-BFT that is set to 1 indicates that A-BFT is present in every BI. Accordingly, in some embodiments, to indicate the absence of A-BFT, the N BIs A-BFT field may be set to zero.

In some embodiments, having introduced the TDD-SP into the 802.11 MAC protocol superframe, an extension to the normal/immediate acknowledgment (Ack) may be added (block acknowledgment (BA) policy '00' as described below). FIG. 14 shows bits 5 and 6 of a quality of service (QoS) control field of the super-frame indicating a BA policy '00' that signals ACK should be sent a certain number of intervals later. As shown in FIG. 14, in some embodiments, when a node within a DN (e.g., DN 400 of FIG. 4) is operating in a DMG TDD-SP mode, ACK may be sent after a certain number of intervals based on the TDD structure instead of a short inter-frame space (SIFS) interval. For example, based on the a determination of the block ACK policy and the TDD slot structure defined for the SP, the receiver of the frame is able to determine when to output an acknowledgement for a transmission that requires acknowledgement and the transmits an ACK/NACK (e.g., block ACK frame) to the transmitter after a certain number of intervals, such as in the next TDD transmission slot assigned to the receiver (e.g., ACK is delayed)). Other rules of Normal/Immediate Ack may stay the same (e.g., as in other systems). In some cases, a responder may send the ACK in the first reverse slot after receiving the eliciting PPDU (Physical Layer Convergence Protocol (PLCP) Protocol Data Unit). First reverse slot is based on the slot-structure (i.e., TDD slot structure) defined by the TDD-SP IE and the schedule. The schedule may be conveyed, for example, through a management frame, or through a higher layer proprietary mechanism.

In some embodiments, an indication may be provided that an existing service period may be operated as a TDD SP (i.e., service period is TDD enabled). As described further below, in relation to FIG. 16, in some embodiments, an indication about an SP being operated as a TDD SP may be provided to other wireless devices in a distribution or mesh network in an information element associated with the 802.11ad superframe. In some embodiments, this indication is provided by adding a "TDD Operation" property or field to an Extended Schedule Element corresponding to the DTI segment.

Figure 15:
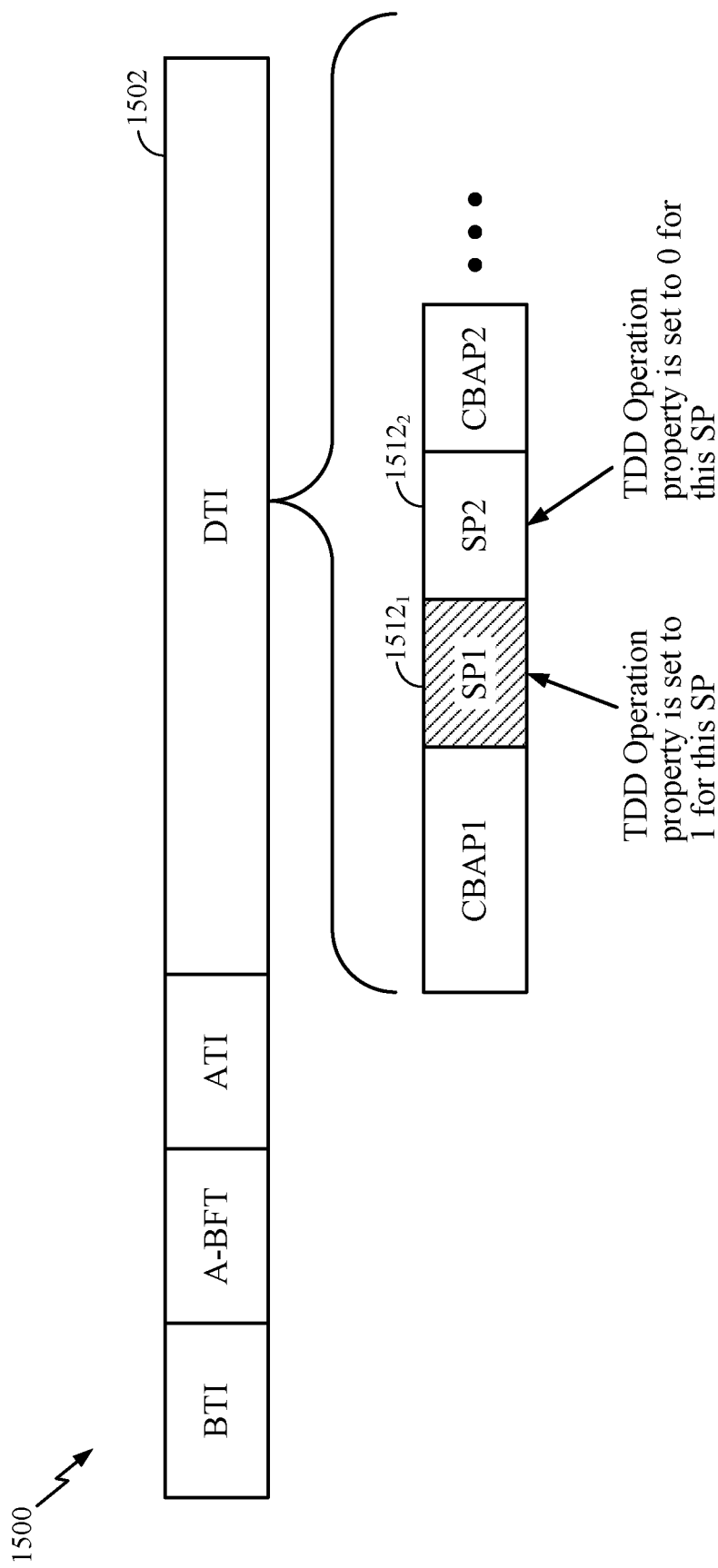
FIG. 15 illustrates an example DTI of a beacon interval including an existing service period that is configured to be available for TDD operation, in accordance with certain aspects of the present disclosure.

FIG. 15 illustrates an example DTI 1512 of the beacon interval 2500 provided by the MAC protocol of 802.11ad. As shown by FIG. 15, SP1 (e.g., SP $1512_1$) is operated as a TDD SP and a TDD Operation property corresponding to SP $1512_1$ is, for example set of 1, as further described below in relation to FIG. 16. In contrast, FIG. 15 shows SP2 (e.g., $1512_2$), which is not operated as a TDD SP and, therefore, its TDD Operation property or field is set to 0. As described above, in certain aspects, each TDD SP (e.g., SP $1512_1$) may comprise a number of time slots (interchangeably referred to as TDD time slots). In certain aspects, each TDD SP may comprise a number of TDD SP Frames (e.g., TDD intervals), each of which may comprise a number of time slots.

Figure 16:
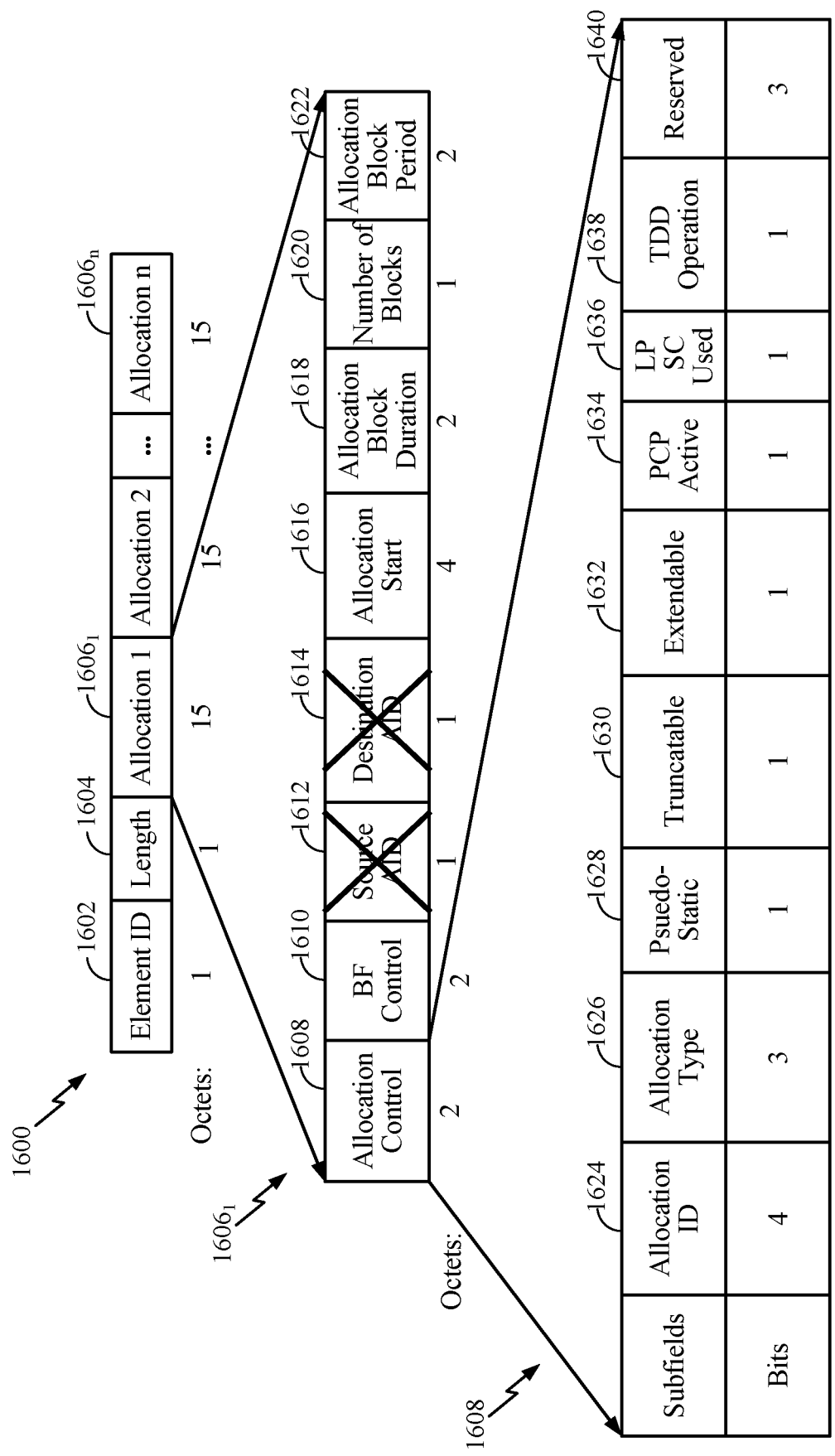
FIG. 16 illustrates an example Extended Schedule Element indicating that the service period of FIG. 15 is available for TDD operation, in accordance with certain aspects of the present disclosure.

FIG. 16 illustrates an example Extended Schedule Element (ESE) 1610 having a number of fields including an element ID 1602, a length 1604, and n Allocation fields ($1606_1$-$1606_n$). Element ID, in certain aspects, is used to identify ESE 1610, as the beacon interval may carry other types of information elements. Length 1604, in certain aspects, indicates the length of ESE 1610 $1n$ some embodiments, each allocation field 1606 (e.g., allocation field $1606_1$) within ESE 1610 comprises a number of subfields including Allocation Control 1608, Beam Forming (BF) Control 1610, Source Association Identification (Source AID) 1612, Destination AID 1614, allocation start 1616, allocation block duration 1618, number of blocks 1620, allocation block period 1622. In some cases, the Source AID (e.g., 1612) and the Destination AID (e.g., 1614) subfields in an Allocation field (e.g., 1606) of the ESE (e.g., 1600) are considered reserved by TDD devices when TDD Operation is set. In such cases, the Source AID 612 and Destination AID 1614 may be set to a particular value, such as 0, so that legacy devices (non-TDD devices) ignore the allocation.

Each allocation field (e.g., Allocation 1 shown as allocation $1606_1$) of the ESE may correspond to a period within the DTI segment (e.g., DTI 1502) of the superframe (e.g., 1500). For example, Allocation 1 ($1606_1$) may correspond to SP1 (SP $1512_1$) of DTI 1502 of FIG. 15. As shown, an allocation field, such as Allocation 1, may include a number of sub-fields such as allocation ID sub-field 1624, allocation type sub-field 1626, pseudo-static sub-field 1628, truncatable sub-field 1630, extendable sub-field 1632, policy control configuration (PCP) active sub-field 1634, LP SC Used sub-field 1636, TDD Operation (e.g., TDD applicable SP subfield) sub-field 1636, Reserved sub-field 1640. Because SP1 (SP $1512_1$) is operated as a TDD SP, a TDD Operation property or subfield 1636 is added to Allocation Control subfield 1608 of Allocation 1 ($1606_1$) in order to indicate to other wireless devices, including TDD devices, that SP1 (SP $1512_1$) is reserved for TDD operation. As illustrated, the TDD Operation property is indicated by a single bit. A TDD operation subfield (e.g., 1638) may be set to a particular value (e.g., in one or more bits) to indicate whether the corresponding service period is a TDD SP or not. For example, the TDD operation subfield may be set to value 1 to indicate that the corresponding service period (e.g., $1512_1$) is a TDD SP (e.g., it is available for TDD SP operation). The TDD operation subfield may be set to value 0 to indicate that the corresponding SP is not a TDD SP. In addition, when an allocation field, such as allocation field $1606_1$, corresponds to a SP, allocation type subfield 1626 is set to a value, such as zero, that is indicative of the allocation field corresponding to a SP.

Figure 17:
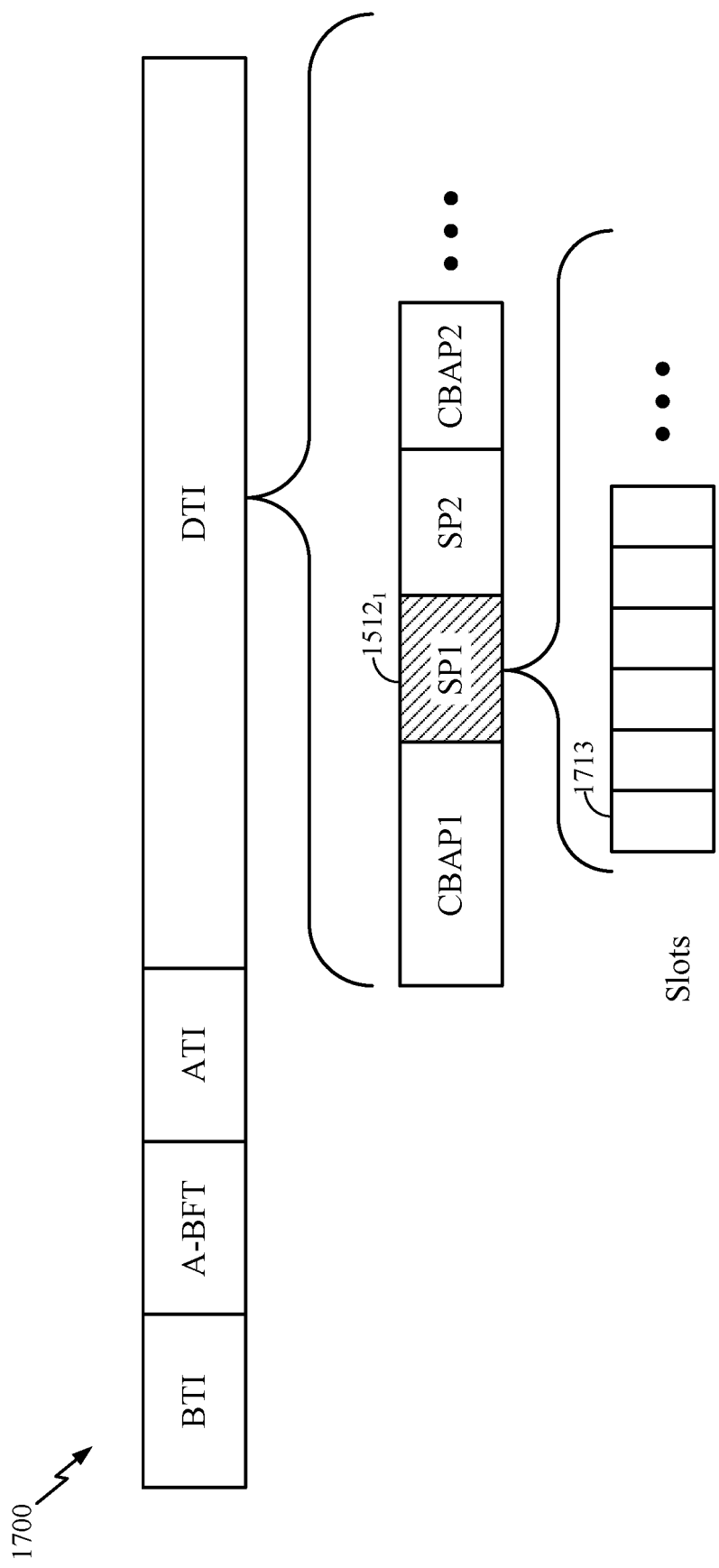
FIG. 17 illustrates the SP of FIG. 15 comprising a plurality of time slots, in accordance with certain aspects of the present disclosure.

For example, as illustrated in FIG. 17, if an SP (e.g., SP $1512_1$) is indicated as TDD via the TDD Operation property bit (e.g., set to 1), that SP may be considered as being made up of a sequence of slots (e.g., slots 1713). In some embodiments, as shown in FIG. 9, an SP (e.g., SP $1512_1$) that is indicated as a TDD SP is considered to be made up of a number of TDD-SP-Frames (e.g., TDD intervals), each of which is itself considered to be made up of a sequence of slots. In other words, slots 1713 shown in FIG. 17 may be grouped into TDD-SP-Frames, such as TDD-SP-Frames 916. In some embodiments, the structure of the slots within a TDD Operations SP (e.g., the duration & polarity) may be communicated through an IE (e.g., TDD slot structure element) carried in Action Frames. An example of such an IE is shown in FIG. 18.

FIG. 18 illustrates an example format of an example IE 1800 (e.g., TDD slot structure element). As illustrated, IE 1800 may have one or more fields including an element ID 1802, a length field 1804, a length of slot polarity bitmap field 1806, an allocation ID field 1808, a slot duration field 1810 and a slot polarity bitmap (e.g., slot schedule) field 1812. Length field 1804 may indicate the length of IE 1800 and may have a value that depends on the length of the slot polarity bitmap field 1812 in IE 1800. The length of slot polarity bitmap 1812 may have a value denoted as L, where the range of L is 1 to 16 bits (e.g., L may be equal to the bit representation+1). Allocation ID field 1808 may take the same value as the Allocation ID (e.g., allocation ID 1624 of FIG. 16) subfield in the Allocation Field (e.g., allocation field 1606₁) of the ESE (e.g., ESE 1600) of the SP allocation for which IE 1800 provides slot structure information.

Slot duration field 1810 may represent the slot duration of one or more of the slots in the SP in some units. For example, assuming the duration is in units of 4 us, the value may be (bit representation+1)*4 us, such that the range is 4 us to 1.024 ms. To simplify, all slots (within an SP) may have equal duration (e.g., the corresponding SP duration should be integral multiple of this value).

Slot polarity bitmap 1812 (e.g., 0: Tx Polarity, 1: Rx Polarity) may denote the repeating pattern of slot polarity starting at the first slot within the TDD Operation SP allocation. For example, a bit that is set to '0' in slot polarity bitmap 1812 indicates that the corresponding slot of the TDD SP has a transmit polarity and can be used for transmission by a wireless device (e.g., the wireless device generating IE 1800). Also, a bit that is set to '1' in slot polarity bitmap 1812 indicates that the corresponding slot of the TDD SP has a receive polarity and can be used for receiving by a wireless device (e.g., the wireless device generating IE 1800). In certain aspects, slot polarity bitmap field 1812 includes multiple bitmaps, where each bitmap corresponds to a slot schedule between two different nodes.

In some cases, a new IE may be introduced to carry schedule information (e.g., TDD Slot Schedule Element). An IE that carries schedule information associated with a TDD SP indicates in which time slots a node that receives the IE should expect to communicate (e.g. transmit or receive) with the transmitter of the IE. In one example, such an IE may be sent unicast by each node (e.g., transmitter of the IE) to each of its neighbor nodes (receivers of the IE). An example of such an IE is shown in FIG. 19.

Figures 20A, 20B, 20C:
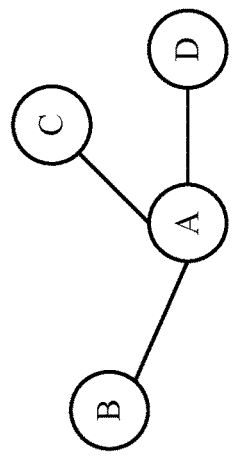
FIGS. 20A-20C illustrate examples of how a bitmap of different IEs (e.g., IE of FIG. 18 or 19) may be used to indicate the slot scheduling of a TDD SP, in accordance with certain aspects of the present disclosure.

As illustrated in FIG. 19, IE 1900 may carry information regarding whether the node that transmits IE 1900 plans to communicate (e.g., transmit or receive) with the neighbor during a particular slot (e.g., see example in FIGS. 20A-20C). In other words, IE 1900 indicates access permission information about each slot in a corresponding TDD SP. In certain aspects, IE 1900 may be carried in an Action frame which may be sent in any TDD Operation SP. In certain aspects, IE 1900 may be carried in the Association Response.

As shown, IE 1900 comprises a number of fields including an element ID 1902, length 1904, number of TDD Operation SPs addressed 1906, TDD Operation SP start time 1908, and bitmap 1910. The length field 1904 indicates the length of IE 1900 and its value depends on the length of bitmap 1910. The number of TDD Operation SPs addressed field 1906 indicates the number of TDD SPs that bitmap 1910 is conveying slot schedule information for. The TDD Operation SP start time 1908 provides the time in microseconds between time synchronization timer (TSF) 0 and the start of the first TDD operation SP (e.g., TDD interval) from which point on, bitmap 1910 is providing schedule information. In other words, TDD Operation SP start time 1908 indicates the time at which the first TDD interval starts. Bitmap 1910 indicates in which time slots a transmitting node (e.g., node that is sending IE 1900 to a neighbor node) is planning to transmit to or receive from a neighbor node that is receiving IE 1900. For example, if a bit corresponding to a time slot in a TDD SP is set to 1, the transmitting node is planning to transmit to or receive from a neighbor node (node receiving IE 1900) in that time slot. If, however, a bit corresponding to a time slot in a TDD SP is set to 0, the transmitting node is not planning to transmit to or receive from a neighbor node (node receiving IE 1900) in that time slot. FIG. 20C shows an illustrative example of bitmap 1910.

FIGS. 20A-20C illustrate examples of how the bitmap (e.g., the slot polarity bitmap) of different IEs may be used for scheduling. As illustrated in FIG. 20A, Node A may have neighbor nodes B, C, and D. Node A may wish to communicate a schedule (e.g., slot polarity bitmap) as shown in FIG. 20B (with Node A transmitting to Node B in slots 0 6, 7, and 8, Node A transmitting to Node C in slot 1, Node A transmitting to Node D in slot 2, Node B transmitting to Node A in slots 3 and 9, Node C transmitting to Node A in slot 4 and Node D transmitting to Node A in Slot 5).

To convey the schedule shown in FIG. 20B, Node A sends the proposed IE (with the example bitmap values) of FIG. 20C to nodes B, C, and D. The values of each bitmap are shown in the table shown in FIG. 20C. Given the polarity settings, communications may be performed between nodes, in the slots shown, with little or no interference.

Example Distribution Node

In some embodiments, in order to perform wireless communications using the slotted time slotted structure described above, a node within a DN (e.g., DN 400) may have or be configured with certain properties. In some embodiments, the node may be referred to as a distribution node, which may be a non-AP (i.e., non-access point) STA. In some embodiments, a boot-up procedure (i.e., authentication, association, etc.) may not be specified for such a distribution node because the distribution node, in some embodiments, may be pre-configured (e.g., with a pre-configuration installed or determined), or, in some other embodiments, the distribution node may be configured by obtaining information through higher layer mechanisms (e.g., such as a cloud controller). In embodiments where the distribution node is configured by higher layer mechanisms, the configuration may be performed out-of-band (e.g., cellular link, configuration information is obtain from an apparatus in a frequency band that is not used by the distribution network, etc.) or by using slots in a TDD-SP allocation that permit transmit/receive with an unassociated node.

In some embodiments, the distribution node may transmit DMG beacon frames. In some embodiments, these frames carry information used to set the network allocation vector field of overlapping basic service set (OBSS) nodes (e.g., virtual carrier sense). In some embodiments, this is the mechanism for managing the coexistence of the distribution node(s) with OBSS nodes. In some embodiments, the DMG beacon frames enable unassociated nodes to discover and communicate with the mesh network. In such embodiments, nodes that are connected to the mesh (e.g., distribution network) may send DMG Beacons (e.g. periodically). Accordingly, unassociated nodes can listen for these beacons to discover the mesh. Unassociated nodes read the DMG beacon to know when to transmit or receive as the TDD-SP allocation may be carried in the DMG Beacon. TDD-SP allocation indicates when unassociated nodes may transmit/receive.

For example, Node B1 of FIG. 4 may be configured as a distribution node that wakes up and sends DMG beacons (such as the superframes shown in FIG. 8 and FIG. 15) to other nodes within the DN 400. In another example, an unassociated node (not shown in FIG. 4) may be configured as a distribution node and receive a DMG beacon and determine in which slots it may communicate with other nodes.

Figure 21:
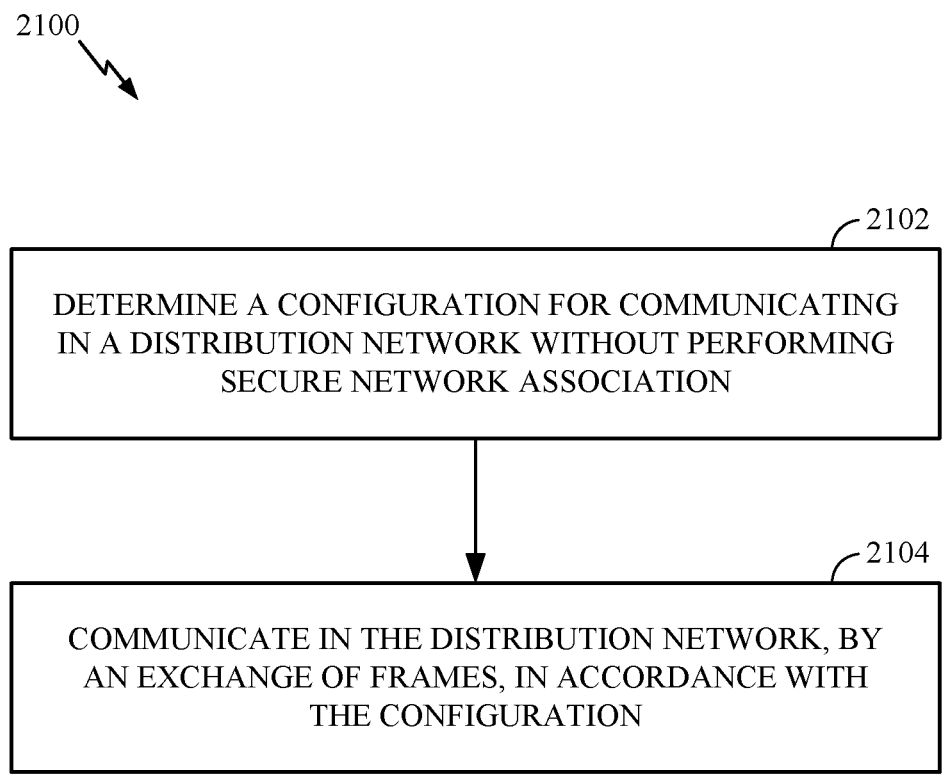
FIG. 21 illustrates example operations for wireless communications for use by a wireless device, in accordance with certain aspects of the present disclosure.

FIG. 21 illustrates example operations 2100 for use by a node within a DN (e.g., DN 400), according to aspects of the present disclosure. Operations 2100 begin, at 2102, by determining a configuration for communicating in a distribution network without performing secure network association. At 2104, operations 2100 continue by communicating in the distribution network, by an exchange of frames, in accordance with the configuration.

Figure 21A:
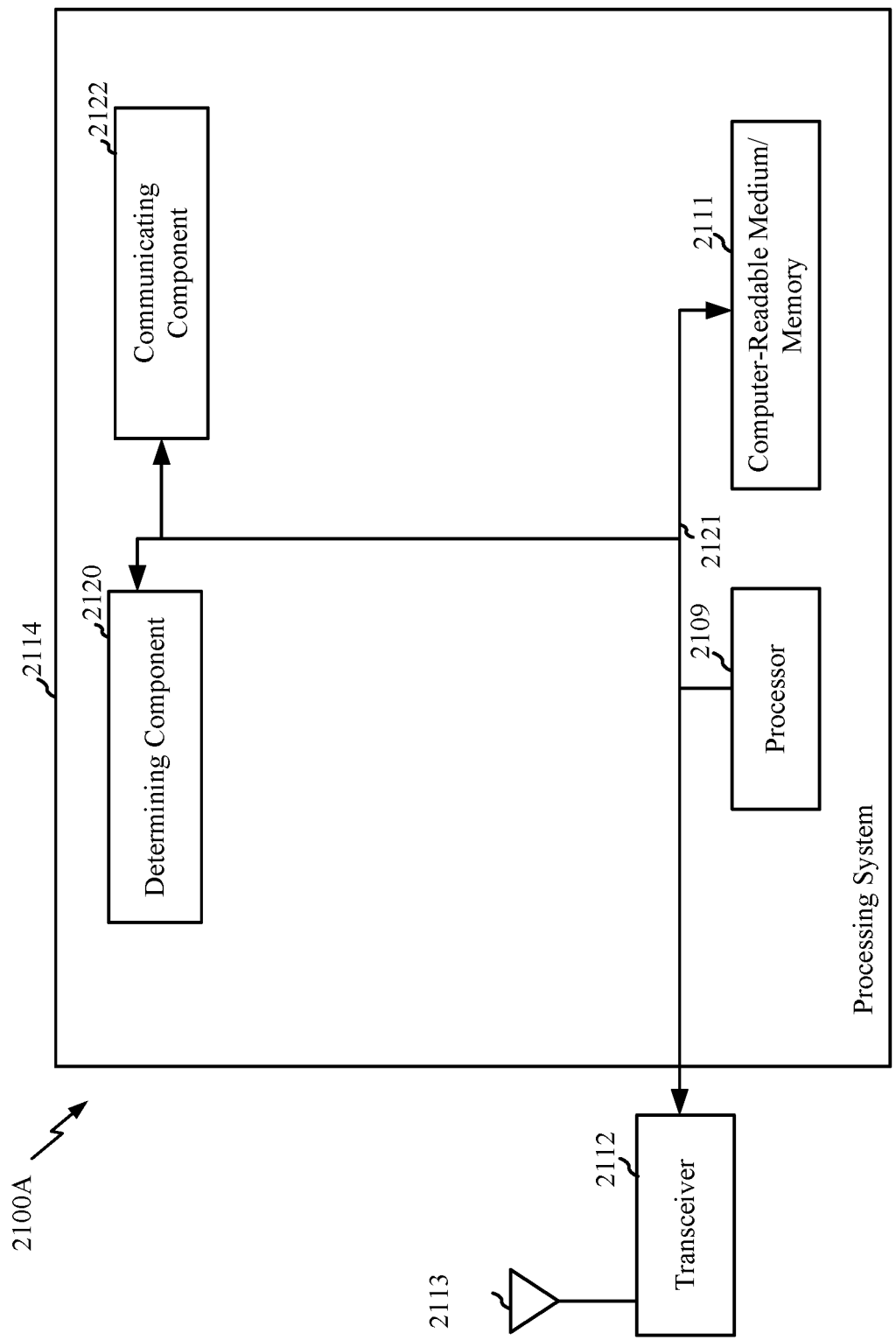
FIG. 21A illustrates example components capable of performing the operations shown in FIG. 21, in accordance with certain aspects of the present disclosure.

FIG. 21A illustrates a wireless communications device 2100A that may include various components (e.g., corresponding to means-plus-function components) configured to perform operations for the techniques disclosed herein, such as one or more of the operations illustrated in FIG. 21. The communications device 2100A includes a processing system 2114 coupled to a transceiver 2112. The transceiver 2112 is configured to transmit and receive signals for the communications device 2100A via an antenna 2113. The processing system 2114 may be configured to perform processing functions for the communications device 2100A, such as processing signals, etc.

The processing system 2114 includes a processor 2109 coupled to a computer-readable medium/memory 2111 via a bus 2121. In certain aspects, the computer-readable medium/memory 2111 is configured to store instructions that when executed by processor 2109, cause the processor 2109 to perform one or more of the operations illustrated in FIG. 21, or other operations for performing the various techniques discussed herein.

In certain aspects, the processing system 2114 further includes a determining component 2120 for performing one or more of the operations illustrated at 2102 in FIG. 21. Additionally, the processing system 2114 includes a communicating component 2122 for performing one or more of the operations illustrated at 2104 in FIG. 21.

The determining component 2120 and the communicating component 2122 may be coupled to the processor 2109 via bus 2121. In certain aspects, determining component 2120 and the communicating component 2122 may be hardware circuits. In certain aspects, determining component 2120 and the communicating component 2122 may be software components that are executed and run on processor 2109.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600, 700, and 1500 illustrated in FIGS. 6, 7, and 15 correspond to means 600A, 700A, and 1500A illustrated in FIGS. 6A, 7A, and 15A, respectively.

For example, means for obtaining may comprise a receiver (e.g., the receiver unit 222) and/or an antenna(s) 224 of the access point 110 or the receiver unit 254 and/or antenna(s) 254 of the user terminal 120 illustrated in FIG. 2. Means for outputting frames for transmission may comprise a transmitter (or other interface). Means for exchanging frames may include a single or multiple interfaces (e.g., a transceiver or separate receiver and transmitter). Means for providing, performing, identifying, indicating, generating, and using may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

In some cases, rather than separate interfaces, a single interface may be used to exchange frames with another device. For example, a single interface may be a transceiver with both transmit and receive functions (or functionality to both output frames for transmission and obtain frames).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a frame with information indicating in which time division duplex (TDD) time slots, in a service period (SP) within a data transfer interval (DTI) of the frame, another apparatus is allowed to communicate; and
at least one interface configured to output the frame for transmission.

2. The apparatus of claim 1, wherein the frame comprises an indication that the SP is available for TDD SP operation.

3. The apparatus of claim 2, wherein the indication is conveyed in an allocation field of an Extended Schedule Element (ESE) of the frame, the allocation field corresponding to the SP.

4. The apparatus of claim 1, wherein the information is conveyed in a TDD slot structure element of the frame, the TDD slot structure element defining a structure of the SP.

5. The apparatus claim 4, wherein the TDD slot structure element comprises an allocation identification (ID) subfield indicating that one or more parameters in the TDD slot structure element apply to the SP.

6. The apparatus of claim 5, wherein the allocation ID subfield has a value equal to a value indicated by an allocation ID subfield in an allocation control field of an allocation field in an Extended Schedule Element of the frame, the allocation field corresponding to the SP.

7. The apparatus of claim 4, wherein the TDD slot structure element comprises one or more fields describing TDD time slots of the SP.

8. The apparatus of claim 7, wherein the SP comprises a number of TDD intervals, each TDD interval comprising a fixed plurality of TDD time slots, and wherein a field of the one or more fields indicates a duration of each of the number of TDD intervals in the SP.

9. The apparatus of claim 7, wherein a bitmap field of the one or more fields includes a bitmap with bit values indicating, for each TDD time slot in the SP, whether the other apparatus receiving the TDD slot structure element is allowed to transmit or receive.

10. The apparatus of claim 7, wherein the one or more fields include a slot structure start time subfield indicating a time between time 0 indicated by a time synchronization timer (TSF) and a start of a first SP in the frame.

11. The apparatus of claim 7, wherein a bitmap field of the one or more fields comprises:
an indication of a first number of TDD time slots from the TDD time slots of the SP available to the other apparatus for reception; and
an indication of a second number of TDD time slots from the TDD time slots of the SP available to the other apparatus for transmission.

12. The apparatus of claim 7, wherein:
the other apparatus is associated with a distribution network; and
the one or more fields comprise an indication of one or more TDD time slots in the SP available for transmission or reception of management frames by wireless devices unassociated with a network.

13. The apparatus of claim 1, further comprising at least one antenna via which the frame is outputted for transmission, wherein the apparatus is configured as a wireless station.

14. An apparatus for wireless communications, comprising:
at least one interface configured to obtain a frame with information indicating in which time division duplex (TDD) time slots, in a service period (SP) within a data transfer interval (DTI) of the frame, the apparatus is allowed to communicate; and
a processing system configured to communicate, via the at least one interface, with at least one other apparatus in the indicated TDD time slots during the SP.

15. The apparatus of claim 14, wherein:
the frame comprises an indication that the SP is available for TDD SP operation, and
the processing system is further configured to identify the SP as available for TDD SP operation based on the indication.

16. The apparatus of claim 15, wherein the indication is obtained in an allocation field of an Extended Schedule Element (ESE) of the frame, the allocation field corresponding to the SP.

17. The apparatus of claim 14, wherein the information is obtained from a TDD slot structure element of the frame, the TDD slot structure element defining a structure of the SP.

18. The apparatus claim 17, wherein the TDD slot structure element comprises an allocation identification (ID) subfield indicating that one or more parameters in the TDD slot structure element apply to the SP.

19. The apparatus of claim 18, wherein the allocation ID subfield has a value equal to a value indicated by an allocation ID subfield in an allocation control field of an allocation field in an Extended Schedule Element of the frame, the allocation field corresponding to the SP.

20. The apparatus of claim 17, wherein:
the TDD slot structure element comprises one or more fields describing TDD time slots of the SP, and
the processing system is further configured to communicate, via the at least one interface, with another apparatus from which the frame is obtained in accordance with the one or more fields describing the TDD time slots of the SP.

21. The apparatus of claim 20, wherein:
the SP comprises a number of TDD intervals, each TDD interval comprising a fixed plurality of TDD time slots, and
a field of the one or more fields indicates a duration of each of the number of TDD intervals in the SP.

22. The apparatus of claim 20, wherein:
a bitmap field of the one or more fields includes a bitmap with bit values indicating, for each TDD time slot in the SP, whether the apparatus is allowed to transmit or receive, and
the processing system is further configured to communicate, via the at least one interface, with an apparatus from which the frame is obtained in accordance with the bitmap.

23. The apparatus of claim 20, wherein the one or more fields include a slot structure start time subfield indicating a time between time 0 indicated by a time synchronization timer (TSF) and a start of a first SP in the frame.

24. The apparatus of claim 20, wherein:
a bitmap field of the one or more fields comprises:
an indication of a first number of TDD time slots from the TDD time slots of the SP available to the apparatus for reception; and
an indication of a second number of TDD time slots from the TDD time slots of the SP available to the apparatus for transmission; and
the apparatus is configured to communicate with the other apparatus in accordance with the indicated first number of TDD time slots and the indicated second number of TDD time slots.

25. The apparatus of claim 20, wherein:
the one or more fields comprise an indication of one or more TDD time slots in the SP available for transmission or reception of management frames by wireless devices unassociated with a network;
the apparatus is configured to obtain configuration information via one or more management frames in one or more of the TDD time slots indicated as available.

26. The apparatus of claim 14, wherein:
the processing system is further configured to determine when to output an acknowledgment for a transmission that requires acknowledgement, based on an acknowledgment policy setting provided in the frame and based on a TDD slot structure as defined for the SP,
the acknowledgment policy indicates that an acknowledgement be sent by the apparatus a certain number of intervals after receiving the transmission; and
at least a second interface of the apparatus is configured to output an acknowledgement for transmission based on the determination.

27. The apparatus of claim 14, further comprising at least one antenna via which the frame is obtained, wherein the apparatus is configured as a wireless station.

28. An apparatus for wireless communications, comprising:
at least one interface, wherein the at least one interface is configured to obtain information from another apparatus; and
a processing system configured to:
determine a configuration for communicating in a distribution network without performing secure network association, wherein the processing system is configured to determine the configuration based on the information obtained from the other apparatus, and wherein the information is obtained via one or more time division duplex (TDD) time slots of a service period (SP), and
communicate in the distribution network, by an exchange of frames, in accordance with the configuration.

29. The apparatus of claim 28, further comprising at least one antenna via which the frames are exchanged, wherein the apparatus is configured as a wireless station.

* * * * *